United States Patent
Bilobrov et al.

(10) Patent No.: US 10,275,578 B2
(45) Date of Patent: Apr. 30, 2019

(54) CONTINUOUS CONTENT IDENTIFICATION OF BROADCAST CONTENT

(71) Applicant: EXCALIBUR IP, LLC, New York, NY (US)

(72) Inventors: Sergiy Bilobrov, Santa Clara, CA (US); Andres Hernandez Schafhauser, Walnut Creek, CA (US)

(73) Assignee: EXCALIBUR IP, LLC, New York, NY (US)

( * ) Notice: Subject to any disclaimer, the term of this patent is extended or adjusted under 35 U.S.C. 154(b) by 0 days.

(21) Appl. No.: 15/645,016

(22) Filed: Jul. 10, 2017

(65) Prior Publication Data

US 2017/0308683 A1 Oct. 26, 2017

Related U.S. Application Data

(63) Continuation of application No. 13/460,684, filed on Apr. 30, 2012, now Pat. No. 9,703,932.

(51) Int. Cl.
*G06F 21/10* (2013.01)

(52) U.S. Cl.
CPC .................................. *G06F 21/10* (2013.01)

(58) Field of Classification Search
CPC .......................................................... G06F 21/10
See application file for complete search history.

(56) References Cited

U.S. PATENT DOCUMENTS

| | | |
|---|---|---|
| 6,574,594 B2 | 6/2003 | Pitman et al. |
| 2002/0067832 A1 | 6/2002 | Jablon |
| 2003/0110485 A1 | 6/2003 | Lu et al. |
| 2004/0162071 A1 | 8/2004 | Grilli et al. |
| 2005/0207416 A1 | 9/2005 | Rajkotia |
| 2006/0190450 A1 | 8/2006 | Holm et al. |
| 2007/0107034 A1 | 5/2007 | Gotwals |
| 2007/0157262 A1 | 7/2007 | Ramaswamy et al. |
| 2007/0055500 A1 | 8/2007 | Bilobrov |
| 2008/0082510 A1 | 4/2008 | Wang et al. |
| 2008/0282303 A1 | 11/2008 | Harkness et al. |
| 2009/0089409 A1 | 4/2009 | Pasko et al. |
| 2010/0013997 A1 | 1/2010 | Hwang |
| 2010/0211967 A1 | 8/2010 | Ramaswamy et al. |
| 2011/0041154 A1 | 2/2011 | Olson |
| 2011/0066489 A1 | 3/2011 | Gharaat et al. |
| 2011/0116719 A1 | 5/2011 | Bilobrov |

(Continued)

*Primary Examiner* — Joe Chacko

(74) *Attorney, Agent, or Firm* — James J. DeCarlo; Greenberg Traurig, LLP

(57) ABSTRACT

The present disclosure provides identification and continuous monitoring of content, such as broadcast content, in real time, using a hierarchical, distributed approach to content identification. Identification, synchronization and verification are provided. Identification may be performed by an identification server using a reference database of fingerprints. The same or another computing device may be used perform synchronization, such that at least some portion of each fingerprint generated by client devices that form a verification group are synchronized for verification. Verification used to determine whether a client device continues to receive the same content identified during identification compares at least a portion of each fingerprint generated by each client device of a verification group. If a mismatch occurs, identification may be repeated to identify the new content being received by a client device.

18 Claims, 18 Drawing Sheets

(56) References Cited

U.S. PATENT DOCUMENTS

| | | |
|---|---|---|
| 2011/0276157 A1 | 11/2011 | Wang et al. |
| 2011/0289098 A1 | 11/2011 | Oztaskent et al. |
| 2011/0296187 A1 | 12/2011 | Bisso et al. |
| 2012/0173749 A1 | 7/2012 | Shah |
| 2012/0209612 A1 | 8/2012 | Bilobrov |
| 2013/0227013 A1 | 8/2013 | Maskatia et al. |

CONTINUOUS CONTENT IDENTIFICATION OF BROADCAST CONTENT

CROSS REFERENCE TO RELATED APPLICATIONS

This application is a continuation of and claims priority from co-pending U.S. patent application Ser. No. 13/460,684, filed Apr. 30, 2012, entitled CONTINUOUS CONTENT IDENTIFICATION OF BROADCAST CONTENT, which is hereby incorporated by reference.

FIELD OF THE DISCLOSURE

The present disclosure relates to identification and continuous monitoring of content, such as broadcast content, in real time, and more particularly to using a hierarchical, distributed approach to content identification.

BACKGROUND

Increasingly, users are able to experience, e.g., view and/or listen to, content using devices, such as smart phones, tablets, personal computers, desktop computers, network-capable televisions, etc., which are also capable of presenting material, e.g., content or information, supplementing the content being experienced by the user.

SUMMARY

The present disclosure seeks to address failings in the art and to provide a hierarchical identification system that significantly reduces the server load and traffic. In so doing, it is possible to automatically scale and handle additional devices, e.g., which may be several million concurrent queries, without adding new identification servers to the system.

A user watching television, for example, may use a device to find additional information related to the broadcasted content. With such a "second screen experience", a user is able to experience content on a television, for example, and related content may be automatically displayed on a mobile device, for example, as the second screen. In presenting the user with supplementary material, it is beneficial to be able to identify what content the user is currently experiencing so that the supplementary material relates in some way to the main content being experienced by the user.

An automated content identification system, which may be used by such systems as IntoNow or Connected TV, may identify content by matching a fingerprint generated from the content, e.g., an audio and/or video portion of the content, with a fingerprint or fingerprints stored in a fingerprint database. To generate a fingerprint, the content may be captured and used by a fingerprinting component, which may comprise hardware, software or both, to generate a fingerprint. The fingerprinting component may be embedded in a device that is capturing content, or fingerprinting component may be connected to a device that is capturing the content. The content may be captured directly from a cable box output (wired connection) or captured using a built-in video camera or microphone, for example. The content may also be transferred wirelessly (Bluetooth) or other means (network connection).

To identify the main content a user is experiencing, a fingerprint of the main content is generated and the fingerprint database is queried using the fingerprint. Content identification may be performed on a continuous basis. For example, as content, such as news, sports, or other TV programs, is being broadcast, audio and/or video signatures, e.g., fingerprints generated from an a portion or portions of the content, are used to query a fingerprint database to identify fingerprint matches. A fingerprint stored in the database is associated with information identifying the content, so that where a fingerprint match is found the content may be identified. An automated content identification system may use signatures or fingerprints of the main content as it is being broadcast, match the fingerprints with fingerprints stored in a database, and then serve users with supplementary content on their main or second screen devices, e.g., tablets. As the number of active connected devices grows, the load on identification servers will increase proportionally to the number of active devices.

In general, the present disclosure provides identification and continuous monitoring of content, such as broadcast content, in real time, using a hierarchical, distributed approach to content identification. In accordance with one or more such embodiments, an identification component is executed by a device, such as a server computer, which identification component identifies content that the user is experiencing using one or more fingerprints and a reference fingerprint database. A verification component is provided by a device, such as a server computer or a client computing device, or as an instance of in a cloud computing environment. The verification component may be used to verity on a continuing basis using one or more fingerprints that content that a user is experiencing continues to be the content identified by an identification component. Embodiments of the present disclosure comprise an ability to distribute verification across multiple server computers, client devices and/or cloud instances. In so doing, for example, it is possible to scale the number of verification resources up or down depending on the need.

In accordance with one or more embodiments, a method is provided, which method comprises receiving, by an identification computing device, a request for a content identification operation to identify content being received by a client computing device, the request comprising a fingerprint generated using the content to be identified; searching, by the identification computing device, a fingerprint database for a reference fingerprint matching the received fingerprint to identify the content being received by the client computing device; where a matching reference fingerprint is found, transmitting, by the identification computing device, a response to the request, the response identifying a verification computing device other than the identification computing device to perform a content verification operation to determine whether or not the client computing device continues to receive the content identified by the identification computing device in the content identification operation.

In accordance with at least one embodiment, a method comprises receiving, by a verification computing device, a request to perform a content verification operation to determine whether or not a client computing device assigned to a verification group of client computing devices assigned to the verification computing device continues to receive identified content, the request comprising a fingerprint generated using content being received by the client computing device; comparing, by the verification computing device, the received fingerprint with one or more reference fingerprints to determine whether or not the content being received by the client computing device is the identified content; where the received fingerprint is determined not to match the one or more reference fingerprints, initiating a content identification operation to identify the content being received by the client computing device.

A method in accordance with one or more embodiments is provided, the method comprising receiving, by a client computing device, a content stream; generating, by the client computing device, a first fingerprint using a portion of the content stream; transmitting, by the client computing device, a request for an identification operation, the request comprising the first fingerprint; receiving, by the client computing device, a response to the request for a content identification operation, the response identifying a verification computing device of a plurality of verification computing devices, the verification computing device to be used to verify whether or not the client computing device continues to receive the content identified in the identification operation; and generating, by the client computing device, a second fingerprint using the content stream; transmitting, by the client computing device, a request to perform a verification operation to the verification computing device identified in the response, the request comprising the second fingerprint.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

In accordance with one or more embodiments, a system comprises at least one identification computing device comprising one or more processors to execute and memory to store instructions to receive a request for a content identification operation to identify content being received by a client computing device, the request comprising a fingerprint generated using the content to be identified; search a fingerprint database for a reference fingerprint matching the received fingerprint to identify the content being received by the client computing device; where a matching reference fingerprint is found, transmit a response to the request, the response identifying a verification computing device other than the identification computing device to perform a content verification operation to determine whether or not the client computing device continues to receive the content identified by the identification computing device in the content identification operation.

In accordance with one or more embodiments, a system comprising at least one verification computing device is provided, the verification computing device comprising one or more processors to execute and memory to store instructions to receive a request to perform a content verification operation to determine whether or not a client computing device assigned to a verification group of client computing devices assigned to the verification computing device continues to receive identified content, the request comprising a fingerprint generated using content being received by the client computing device; compare the received fingerprint with one or more reference fingerprints to determine whether or not the content being received by the client computing device is the identified content; where the received fingerprint is determined not to match the one or more reference fingerprints, initiate a content identification operation to identify the content being received by the client computing device.

In accordance with one or more embodiments, a system comprising at least one client computing device is provided, the client computing device comprising one or more processors to execute and memory to store instructions to receive a content stream; generate a first fingerprint using a portion of the content stream; transmit a request for an identification operation, the request comprising the first fingerprint; receive a response to the request for a content identification operation, the response identifying a verification computing device of a plurality of verification computing devices, the verification computing device to be used to verify whether or not the client computing device continues to receive the content identified in the identification operation; generate a second fingerprint using the content stream; and transmit a request to perform a verification operation to the verification computing device identified in the response, the request comprising the second fingerprint.

In accordance with one or more embodiments, a computer readable non-transitory storage medium is provided, the computer readable non-transitory storage medium for tangibly storing thereon computer readable instructions that when executed cause at least one processor of an identification computing device to receive a request for a content identification operation to identify content being received by a client computing device, the request comprising a fingerprint generated using the content to be identified; search a fingerprint database for a reference fingerprint matching the received fingerprint to identify the content being received by the client computing device; where a matching reference fingerprint is found, transmit a response to the request, the response identifying a verification computing device other than the identification computing device to perform a content verification operation to determine whether or not the client computing device continues to receive the content identified by the identification computing device in the content identification operation.

A computer readable non-transitory storage medium is provided, in accordance with one or more embodiments, the computer readable non-transitory storage medium for tangibly storing thereon computer readable instructions that when executed cause at least one processor of a verification computing device to receive a request to perform a content verification operation to determine whether or not a client computing device assigned to a verification group of client computing devices assigned to the verification computing device continues to receive identified content, the request comprising a fingerprint generated using content being received by the client computing device; compare the received fingerprint with one or more reference fingerprints to determine whether or not the content being received by the client computing device is the identified content; where the received fingerprint is determined not to match the one or more reference fingerprints, initiate a content identification operation to identify the content being received by the client computing device.

In accordance with one or more embodiments, a computer readable non-transitory storage medium is provided, the computer readable non-transitory storage medium for tangibly storing thereon computer readable instructions that when executed cause at least one processor of a client computing device to receive a content stream; generate a first fingerprint using a portion of the content stream; transmit a request for an identification operation, the request comprising the first fingerprint; receive a response to the request for a content identification operation, the response identifying a verification computing device of a plurality of verification computing devices, the verification computing device to be used to verify whether or not the client computing device continues to receive the content identified in the identification operation; generate a second fingerprint using the content stream; and transmit a request to perform a verification operation to the verification computing device identified in the response, the request comprising the second fingerprint.

DRAWINGS

The above-mentioned features and objects of the present disclosure will become more apparent with reference to the following description taken in conjunction with the accompanying drawings wherein like reference numerals denote like elements and in which:

FIG. 1 provides a generalized view in accordance with one or more embodiments.

FIG. 2 provides an example of a content identification hierarchy in accordance with one or more embodiments of the present disclosure.

FIG. 3 provides an example of a content identification hierarchy where a client device is assigned to a verification server of a verification cloud in accordance with one or more embodiments of the present disclosure.

FIG. 4, which comprises FIGS. 4A and 4B, provide an example of a client device switching verification servers in accordance with one or more embodiments.

FIG. 5 provides an example of peer-to-peer verification in accordance with one or more embodiments of the present disclosure.

FIG. 6 provides an example of initial and subsequent timestamps used in accordance with one or more embodiments of the present disclosure.

FIG. 7 provides an example in which client devices of a group of peers are connected using determined fingerprint overlaps in accordance with one or more embodiments.

FIG. 8 provides an example of splitting client devices into multiple groups during synchronization in accordance with one or more embodiments of the present disclosure.

FIG. 9 provides an example of synchronization using a client device capable of receiving multiple content streams in accordance with one or more embodiments.

FIG. 10 provides an example of fingerprint database storage in accordance with one or more embodiments of the present disclosure.

FIG. 11 provides another example of fingerprint database storage in accordance with one or more embodiments of the present disclosure.

FIG. 12, which comprises FIGS. 12A and 121B, provide an example of duplicate fingerprints and a fingerprint index in accordance with one or more embodiments.

FIG. 13 provides a process overview, which includes identification, synchronization and verification, in accordance with one or more embodiments.

FIG. 14 provides a process flow example including intercommunication between an identification device and a client device in accordance with one or more embodiments.

FIG. 15 provides an example of a verification process flow in accordance with one or more embodiments of the present disclosure.

DETAILED DESCRIPTION

Figure 1:
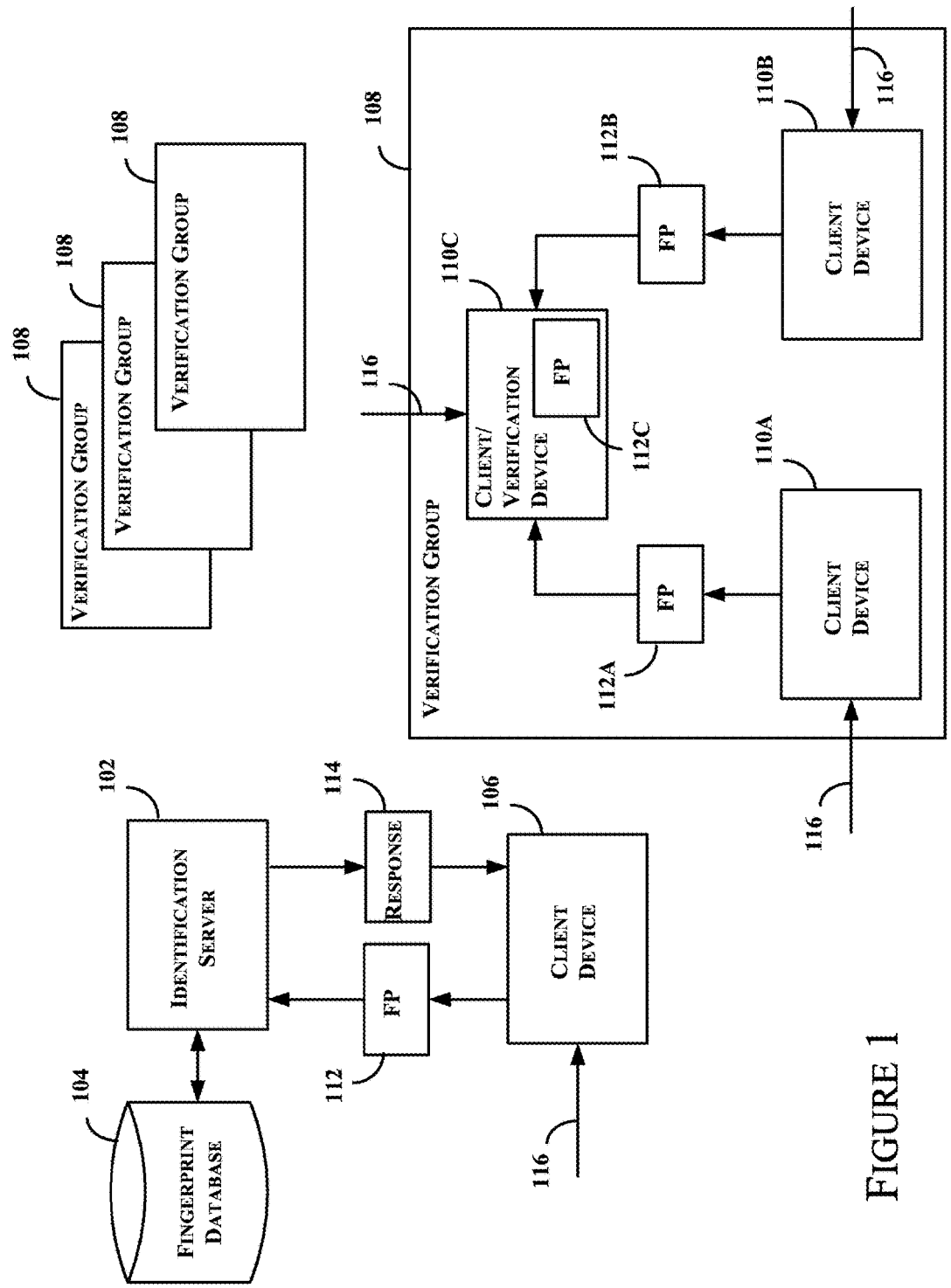

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While one or more embodiments of the present disclosure may be discussed with reference to a particular type of media, media content or media content item, the present disclosure is not limited to one particular type of media. Embodiments of the present disclosure can be used with any type media, media content or media content item, including without limitation digital content such as audio, video, multimedia, music, tracks, movies, television or other programming, commercials, images, slides, etc. A media stream can be considered to be a collection of media content, and an item in a collection of media content, such as without limitation a media stream, may be referred to as an "item of media content" or a "media content item," and may be retrieved from the media stream or collection.

The detailed description provided herein is not intended as an extensive or detailed discussion of known concepts, and as such, details that are known generally to those of ordinary skill in the relevant art may have been omitted or may be handled in summary fashion.

Certain embodiments of the present disclosure will now be discussed with reference to the aforementioned figures, wherein like reference numerals refer to like components.

In general, the present disclosure provides identification and continuous monitoring of content, such as broadcast content, in real time, using a hierarchical, distributed approach to content identification. In accordance with one or more embodiments, identification, synchronization and verification of content streams are provided using signatures, such as digital fingerprints generated from the content.

In accordance with one or more such embodiments, an identification component is executed by a device, such as a server computer, which identification component identifies content that the user is experiencing using one or more fingerprints and a reference fingerprint database. A verification component is provided by a device, such as a server computer or a client computing device, or as an instance of in a cloud computing environment. The verification component verifies on a continuing basis using one or more fingerprints that content that a user is experiencing continues to be the content identified by an identification component. The verification component might determine that the content is not the same as the identified content where the user changes channels, for example. Embodiments of the present disclosure comprise an ability to distribute verification across multiple verification server computers, client devices and/or cloud instances. In so doing, for example, it is possible to scale the number of verification resources up or down depending on the need.

In accordance with one or more embodiments, synchronization may be performed by an identification server computer or another computing device or computing devices, e.g., a computing device executing a verification component. Synchronization synchronizes fingerprint generation by a group of client devices belonging to a verification group such that there is at least some portion of each fingerprint generated by each of the client devices in common. As discussed above, verification performed by a verification component determines whether a client device continues to receive the same content identified during identification, e.g., by comparing at least a portion of each fingerprint generated by each client device of a verification group. If a mismatch occurs, identification may be repeated to identify the new content being received by a client device.

In accordance with one or more embodiments, verification is performed in a distributed manner by a server computer or other computing device other than the computing device(s) performing identification. In accordance with one or more embodiments, cloud computing may be used, such that verification may be performed using a computing device or devices available via a network, including but not limited to the Internet. Computing resources, including those used to perform verification, may be scaled up or back dependent on need. Thus, as more users are experiencing, e.g., listening and/or watching, content, the number of verification groups and corresponding verification components used to perform verification may be increased. Conversely, as the number of users experiencing content decreases, the number of verification groups and corresponding verification components used to perform verification may be decreased. In so doing, a number of verification components may be enlisted to meet current verification demands. Additionally and since verification need not be performed by an identification server, the identification server is not impacted by verification demands and changes in verification demands.

FIG. 1 provides a generalized view in accordance with one or more embodiments. In accordance with one or more such embodiments, a recording device, e.g., a device capturing content such as client device 106, which device may be any device including without limitation a mobile device, such as a smart phone, tablet, set-top box, TV, computer, player such as without limitation a digital video disc ("DVD") player, or other device, receives a content stream 116 and generates a fingerprint 112, which may be generated from a portion of audio and/or video of the input content stream 116. In accordance with one or more embodiments, a client device, such as client device 106, comprises a component, which may be hardware, software or some combination, which is configured to generate fingerprints, transmit a request, such as identification and verification requests, and receive a response.

In a content identification phase, client device 106 forwards a fingerprint 112 generated from content 116 to a default device executing an identification component, such as identification server 102, which is coupled to fingerprint database 104. In response to receiving fingerprint 112, server 102 compares fingerprint 112 with one or more reference fingerprints stored in fingerprint database 104 to identify a match between the received fingerprint 112 and a reference fingerprint stored in fingerprint database 104. Where a match is found, the content 116 being received by client device 106 may be identified. By way of a non-limiting example, the fingerprint database, or an associated data store, may contain information identifying content 116, so that where a reference fingerprint stored in fingerprint database 104 matching the received fingerprint 112 may be used to access information about content 116, including a reference identifier (ID), for example.

Identification server 102 transmits a response 114 to client device 106. Where a match is found, response 114 comprises information identifying the content, such as a reference ID, as well as information identifying a computing device that comprises a verification component, such as a universal resource location (URL) identifying such computing device. In accordance with one or more embodiments, identification information may identify a computing device executing a verification component servicing a verification group 108. In the example shown in FIG. 1, the URL provided in the response 114 directs the client device 106 to client/verification device 110C, which is a computing device executing at least one verification component, and verification group 108.

In accordance with at least one embodiment, the content identification information provided in response 114 may comprise information identifying a source of the content, such as channel, program, file name, as well as a time offset within the content, associated metadata. The information may be used for succeeding queries, such as queries used in a verification phase.

In accordance with one or more embodiments, a verification group 108 comprises a number of client devices, each of which is initially identified as receiving the same content, which identification may be made by identification server 102 in a manner similar to that discussed above in connection with client device 106. As is discussed below, client devices 110 of verification group 108 are in synchronization such that at least a portion of the fingerprint generated by each one of the client devices 110 overlaps and can be used to perform a fingerprint matching operation. In the example shown in FIG. 1, client devices 110A, 110B and 110C are synchronized so that the fingerprint 112 generated by each, i.e., fingerprint 112A generated by client device 110A, fingerprint 112B generated by client device 110B and fingerprint 112C generated by client device 110C, have at least a portion in common. Also, in the example shown in FIG. 1, there may be multiple verification groups 108, each of which comprises a number of client devices 110.

In the example provided in FIG. 1, one of the verification groups 108 comprises client devices 110A, 110B and 110C, each of which has undergone identification to identify the content that it is receiving, which identification indicates that all of the client devices 110A, 110B and 110C are receiving the same content at least at the time of identification. The client devices may receive or capture the content from different sources. For example, a client device 110A may use a microphone to record surround sound, client device 110B may capture analog or digital audio from an external device such as a cable box or satellite receiver and device 110C may directly access the signal being reproduced by the device, which might be a television, DVR player, home theatre receiver, etc.

In accordance with one or more embodiments, fingerprints may be verified on a client device which has a verification component where the client device is accessible to other client devices. Where the client device is not accessible, such as where all of the client devices in the group are behind a firewall, a computing device, such as a server computer, executing a verification component, e.g., a verification server, which is accessible to each of the devices in the verification group may be used. In accordance with one or more embodiments, such a verification server may be a dedicated verification server, which receives fingerprints from client devices and does not produce fingerprints.

The client devices 110A, 110B and 110C have undergone synchronization. In a verification phase, each client device 110A, 110B and 110C generates a fingerprint 112 using the content that it is receiving. Since the client devices are in synchronization, the fingerprint 112 generated by each client device 110 may be compared to a fingerprint 112 generated by one or more of the other client devices 110 in the verification group 108. In the example of FIG. 1, the identification information may comprise a URL of client device 110C, where content 116 is the same content as is identified as being received by client devices 110A, 110B and 110C.

In accordance with one or more embodiments, client device 110C comprises a computing device having a verification component and is configured to determine whether or not clients 110A, 110B and 110C continue to receive the same content. Like client devices 110A and 110B, client device 110C receives content and generates a fingerprint. Instead of sending its fingerprint to a server, such as server 102 for verification, client devices 110A and 110B forward their fingerprints 112 to client device 110C and client device 110C retains its fingerprint 112 for comparison with the other fingerprints 112 received from client devices 110A and 110B.

Client 110C receives a fingerprint 112 from each of client devices 110A and 110B and compares the received fingerprints 112 with its fingerprint 112 to verify or confirm whether each of the client devices 110 in verification group 108 continues to receive the same content. Where the received fingerprints 112 match the fingerprint 112 generated by client device 110C, the verification confirms that the client devices 110A, 110B and 110C continue to receive the same content. Where any fingerprint 112 differs, the verification process can be used to determine which client device or devices has a different fingerprint 112 and is no longer receiving the same content. In accordance with one or more embodiments, where a match is not found, the verification may be repeated one or more times to ensure that a fingerprint 112 is being generated from different content. Where it is determined that a content device is no longer receiving the same content, the device may be reassigned to another verification group 108 identified as receiving the same content as the device.

In accordance with one or more embodiments, in a synchronization process, client devices of a verification group 108 are synchronized so that the fingerprint 112 generated by each client device overlaps and represents at least a portion of the same content used by the verification group's other client devices to generate a fingerprint 112. By way of a non-limiting example, all of the client devices 110 of a verification group 108, which are identified as receiving the same content 116, are synchronized so that each client device 110 generates a fingerprint 112 from a common portion of the content 116. Synchronization may be performed by identification server 102 or by the verification component servicing the verification group 108 to which client device 106 is assigned.

In accordance with one or more embodiments, synchronization may be performed by virtue of each of the client devices being assigned to a verification group 108 and instructed to generate a fingerprint 112 at a specified same time, which time may be based on a timestamp or other timing information provided to the client device in response 114. In so doing, each client device belonging to a verification group may be synchronized so that each fingerprint 112 is being generated using a common portion of the content based on the specified timing. Alternatively, client devices may be selected for a verification group 108 based on a timing already being used by the client device to generate a fingerprint 112, so that each client device selected for a verification group 108 uses a same or substantially similar portion of the content to generate a fingerprint. It should be apparent that any synchronization technique may be used. As yet another example, client devices need not use the exact same portion of the content as long as there is a sufficient overlap that a common portion of a fingerprint 112 can be compared to determine whether or not there is a match. Each client device may forward a fingerprint 112 and timing information, which may be used by the verification component to locate a common portion from a fingerprint 112 received from each client device and to perform a verification.

In the example shown in FIG. 1, client device 110C comprises a verification component and compares the fingerprint 112 of each client device 110 in the verification group 108 to confirm that each device continues to receive the same content, or to confirm that a client device has switched to receiving other content, such as where the user changes channels. In accordance with one or more embodiments, the verification component may be installed on a peer device, such as in a peer-to-peer ("P2P") environment. In accordance with one or more embodiments, a verification component, e.g., a verification server, may be installed on a server computer. In accordance with one or more embodiments, a verification component may be an instance that is executable via a cloud computing service/provider. In accordance with one or more embodiments, a hierarchical, distributed network comprises one or more identification servers 102 coupled to a fingerprint database 104, and a plurality of verification components, each of which may be executed by another client device, such as client device 110C, a peer device, a server, or a cloud service. In accordance with one or more embodiments, identification and verification components may be run on the same computing device.

Once a client device is synchronized with a verification component, such as the verification component being provided by client device 110C or another computing device or server computer configured to provide verification, the verification component and client device switch into a verification mode. In the verification mode, the client device, such as client devices 110A and 110B for example, periodically transmits a verification request, and client device 110C periodically generates a fingerprint 112 and compares it with the fingerprints 112 received from client devices 110A and 110B. When a user switches content, such as when a user switches television channels, the client device becomes out of sync and a identification phase may be repeated in order to identify the new content to which the user switched, which phase may be followed by the synchronization and verification phases.

In accordance with one or more embodiments, a verification component installed on client device 110C may be configured as a dedicated verification server that compares fingerprints 110A and 110B. In such a case client device 110C is not required to generate fingerprint 112C to verify fingerprints 110A and 110B. To serve as a verification server for other devices, client device 110C may just compare fingerprints received from client devices 110A and 110B.

In accordance with one or more embodiments, a verification request or query made by a client device may include a network address of a computing device executing a verification component, content identification information, such as channel, or other content, identifier (ID), file identifier/name, and an offset within the content/file for the portion of content used to generate fingerprint 112. The client device's request may include an offset and the new fingerprint, which request is sent to the verification component identified in the response received from the identification server 102. Instead of performing a complete search of a fingerprint database, the verification component may compare the query fingerprint with a reference fingerprint specified in the request, or calculated using the content and other information provided in the request. A verification performed in such a manner is several orders of magnitude faster than a full-size (initial) search of a fingerprint database, such as fingerprint database 104. In so doing, verification may be performed several orders of magnitude faster than the initial search performed by an identification server 102. A pointer to an exact match location for fingerprint verification may be calculated based on previous file ID and recording timestamp.

A hierarchical identification network provided in accordance with at least one embodiment is able to efficiently handle a large number of connected client devices. A verification group comprising a number of client devices may perform local search and verification without querying a central server. Additionally, a device may be connected to other devices in the P2P network and perform distributed search and verification, which P2P identification system significantly reduces network traffic and load on central servers and is able to scale automatically as the number of connected devices grows.

This is in contrast to an approach whereby multiple connected devices generate fingerprints and query a centralized server used to perform both identification and verification. When a new device is added, an identification/verification server must be able to accommodate identification and verification queries from the new device as well as the multiple devices already connected to the server. Thus, adding a client device increases the traffic and load on the server.

Figure 2:
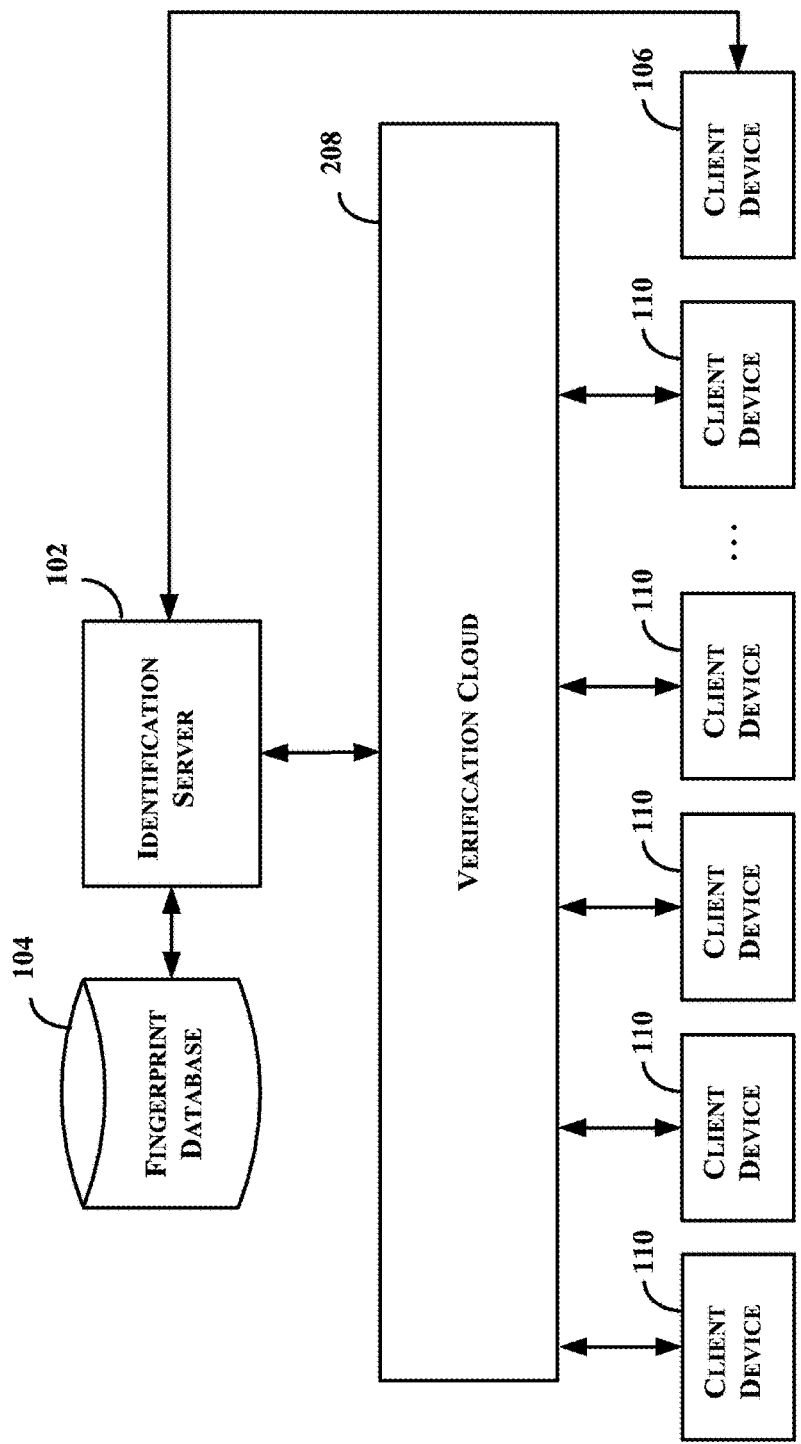

FIG. 2 provides an example of a content identification hierarchy in accordance with one or more embodiments of the present disclosure. An identification level of the hierarchy may comprise one or more identification server(s) 102, each of which is coupled to a fingerprint database 104. The fingerprint database 104 may be shared by one or more identification servers 102. Alternatively, an identification server 102 may have its own fingerprint database 104.

Another level of the hierarchy, a verification level, may comprise a number of computing devices each having a verification component, represented in the example as a verification cloud 208, each verification component services a group of client devices 110. The verification cloud 208 may comprise any number of computing devices each executing one or more verification components. Thus, in accordance with one or more such embodiments, instead of verifying client content by matching the client fingerprint with the reference fingerprint at an identification server, e.g., a server 102 coupled to a centralized reference database 104 used to identify the content, once in sync, a verification cloud 208, which comprises a plurality of computing devices having verification components, may be used to verify the client devices 110.

As discussed above, a client device 110 may be executing a verification component and verify its own fingerprint together with the fingerprints provided by the other client devices 110 in a verification group 108. Alternatively, client device 110 may be executing a verification component, which is configured as a verification server that verifies fingerprints provided by the other client devices 110 in a verification group 108, but not its own fingerprint(s). Verification cloud 208 may comprise verification component instances, which both generate and verify fingerprints and verification component instances, such as dedicated verification servers, which verify fingerprints without generating a fingerprint. Each computing device that performs verification has a verification component. In accordance with one or more embodiments, a verification component may comprise software, hardware or both, and is configured to perform verification. Each verification component belonging to verification cloud 208 services a group of synchronized client devices 110.

By way of a non-limiting example, each synchronized client device 110 sends its fingerprint to a verification component of verification cloud 208, e.g., using a URL identifying a computing device executing the verification component servicing the verification group to which the client device 110 is assigned. As discussed above, a particular verification component may be specified by identification server 102. Such verification component may have a reference database and search capabilities; however, a verification component provided by a client device such as client device 110C, which compares its fingerprint and fingerprints that it receives from other client devices need not use a reference fingerprint database. A verification server may receive similar fingerprints from multiple client devices 110 and compare them with each other and/or a reference fingerprint database fingerprint entry to verify that the devices are still experiencing, e.g., listening and/or watching, the same content, e.g., television program. This type of configuration where one verification server services many client devices 110 may be referred to as one-to-many verification.

Figure 3:
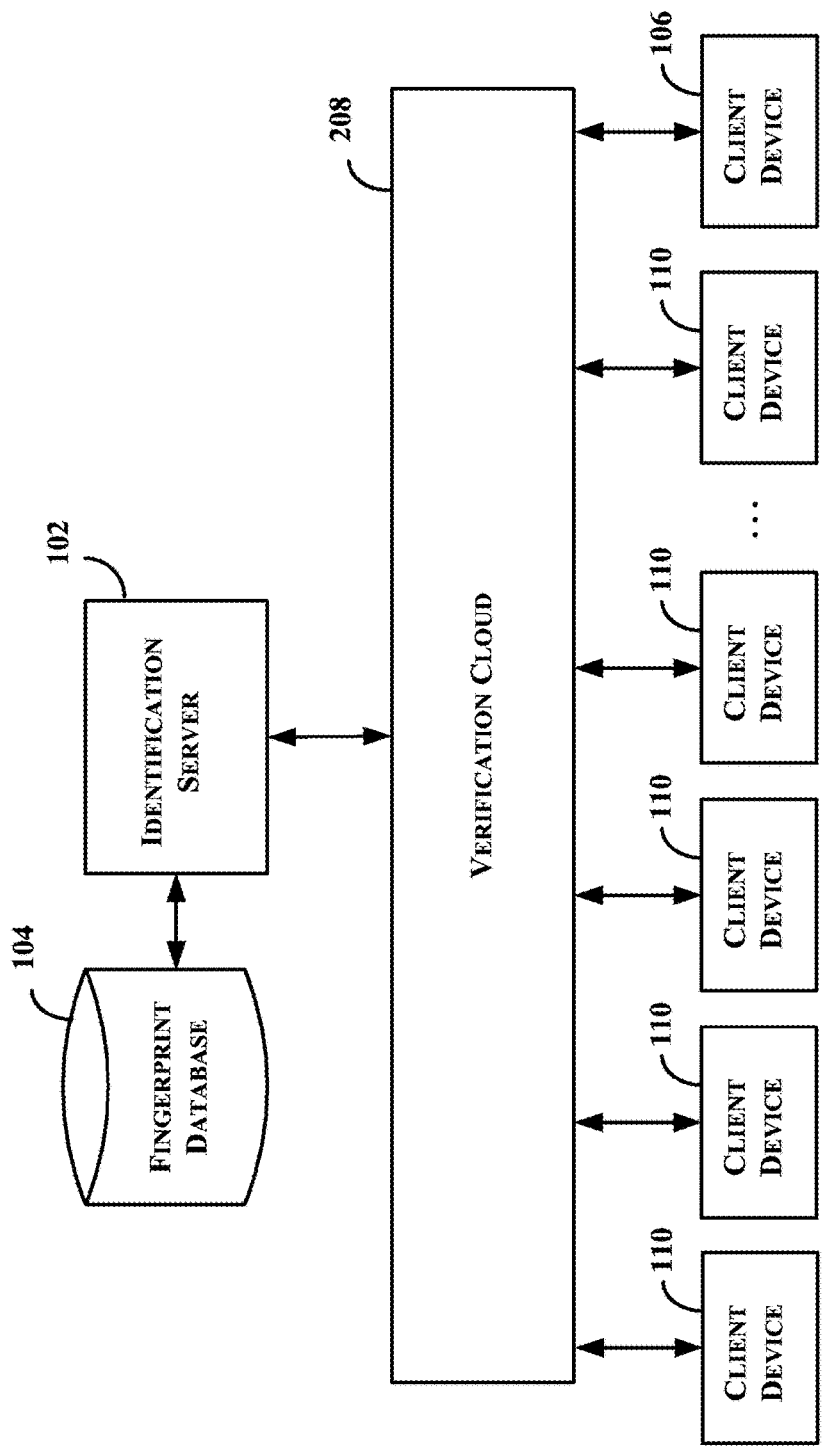

In the example shown in FIG. 2, client device 106 is in communication with identification server 102 to identify the content being received by client device 106 as well as verification component of verification cloud 208. FIG. 3 provides an example of a content identification hierarchy where client device 106 of FIG. 1 is assigned to a verification component of verification cloud 208 in accordance with one or more embodiments of the present disclosure.

Figure 4A:
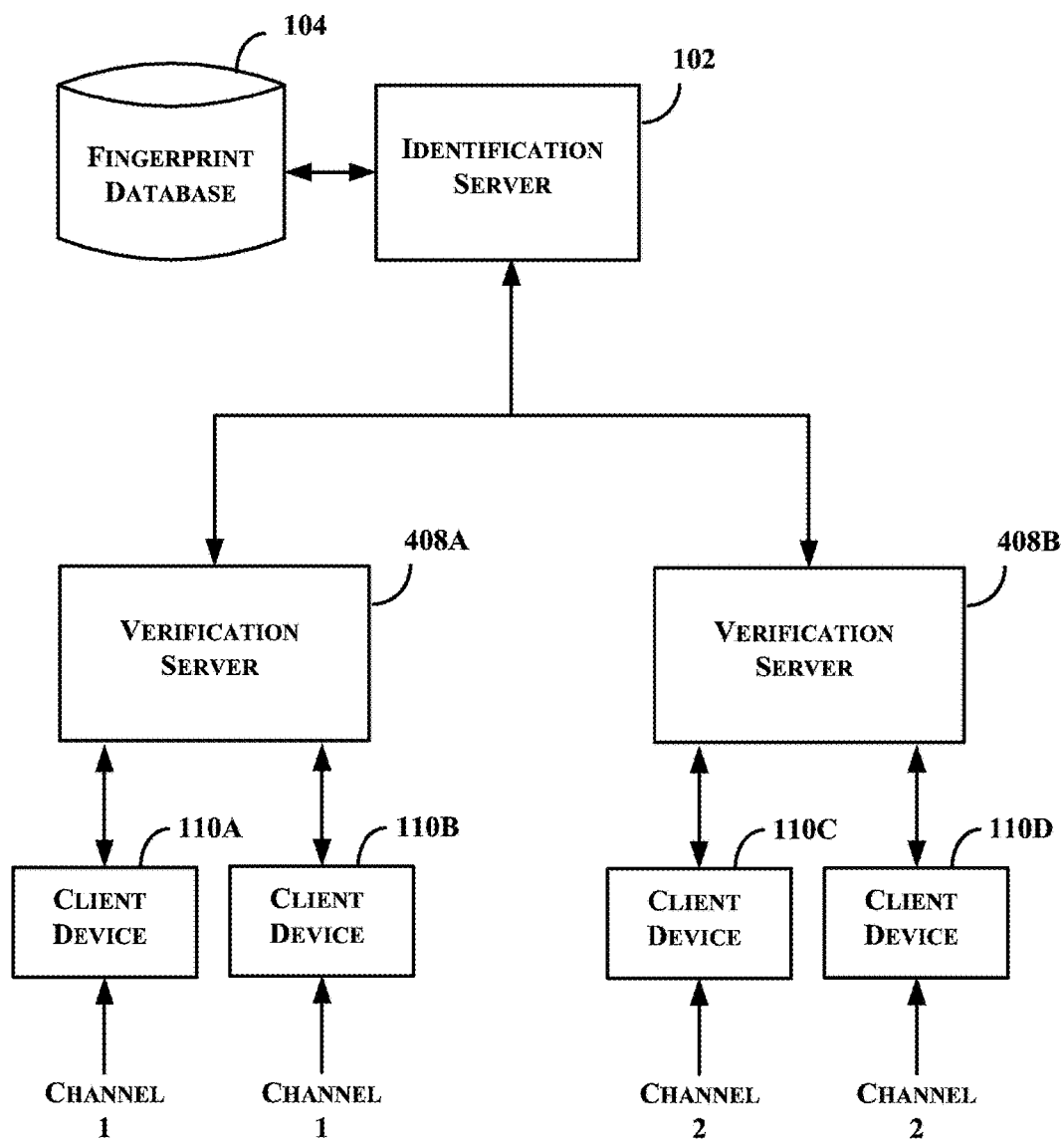
Figure 4B:
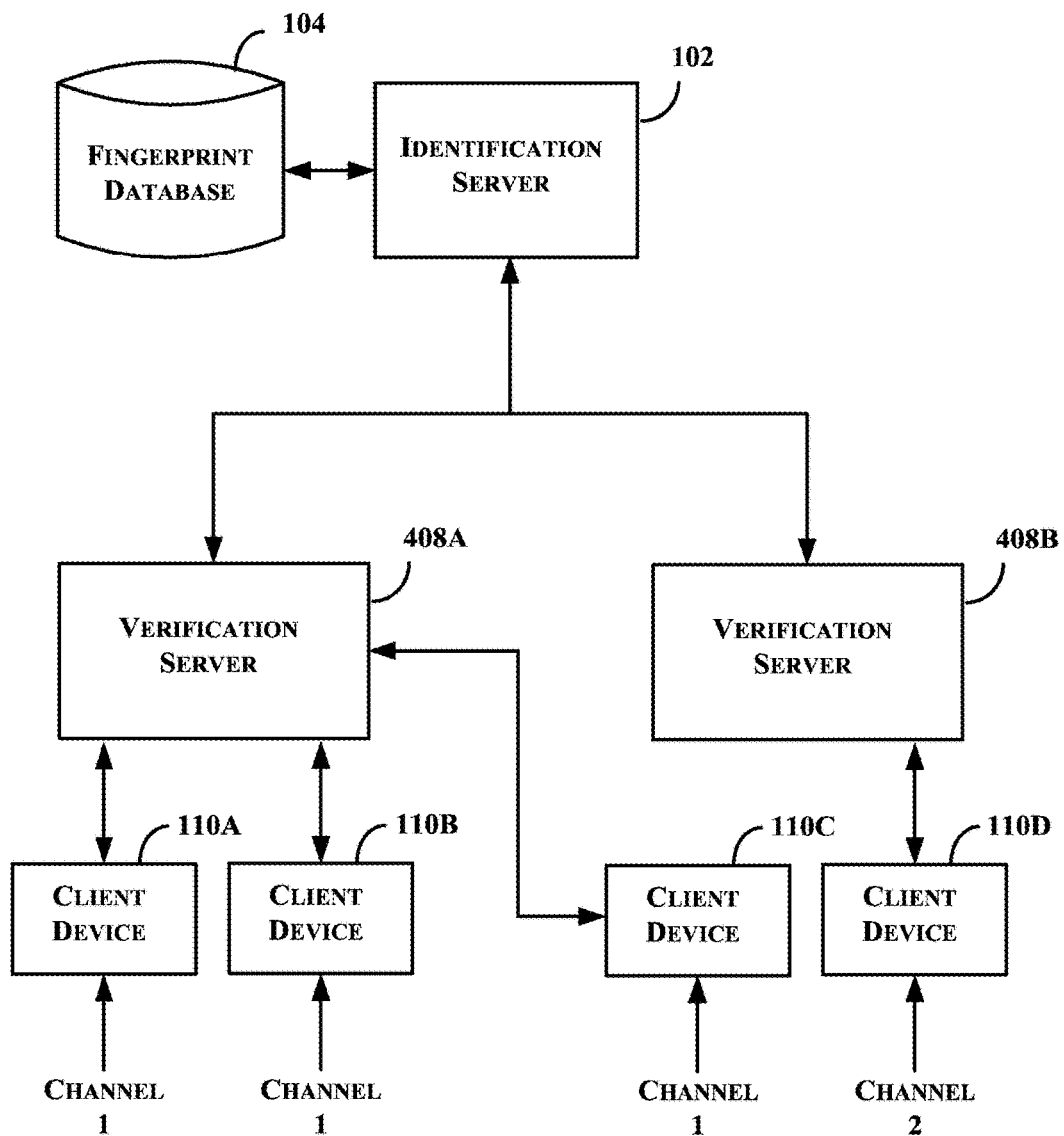

As discussed above, successive fingerprints may be generated and used to determine whether or not a client device 110 is receiving the same or different content to the content that was identified in the identification phase. Where one or more fingerprint verification operations fail for a client device 110, such as where the fingerprint provided by a client device 110 of a verification group 108 does not match fingerprints provided by the other client devices 110 of the verification group 108, it is likely that the user has switched to other content, such as another television program. In such a case, the identification process may be repeated, such that the client device 110 sends a query to an identification server 102, which server identifies the content being received by the client device 110 and transmits a response including information identifying a verification component for client device 110. FIG. 4, which comprises FIGS. 4A and 4B, provide an example of a client device switching verification servers in accordance with one or more embodiments.

With reference to FIG. 4A, client devices 110A and 110B are serviced by verification server 408A, and client devices 110C and 110D are serviced by verification server 408B. In the example shown, verification servers 408A and 408B may be a user computing device, a server computer or other computing device executing a verification component configured to verify, without generating, fingerprints. In the example shown, client devices 110A and 110B are receiving content from a first content channel referred to as "Channel 1", e.g., a program broadcast on a television channel, and client devices 110C and 110D are receiving content from a second channel, "Channel 2." During an identification phase, identification server 102 responds to identification requests from each of the client devices 110 and provides each with content identification information and verification server identification information. By way of a non-limiting example, the verification server identification information may include a URL of a verification server, e.g., server 408A for client devices 110A and 110B and server 408B for client devices 110C and 110D. During verification, client devices 110A and 110B each provide verification server 408A with a fingerprint generated from "Channel 1" content, and client devices 110C and 110D each provide verification server 408B with a fingerprint generated from "Channel 2" content.

At some point, client device 110C may change from "Channel 2" to Channel 1," and begin generating a fingerprint using "Channel 1" content. Verification server 408A detects that client device 110C is no longer receiving "Channel 2" content. In the example shown in FIG. 4A, verification server 408B may forward a request including a fingerprint generated from the content being received by client device 110C, to identification server 102 to initiate an identification for client device 110C. Identification server 102 performs a search of fingerprint database 104, finds a match indicating that client device 110C is now receiving "Channel 1" content, and transmits a response to verification server 408B, which response includes a URL of verification server 408A. Verification server 408B may transmit all or a portion of the response to client device 110C, including the URL of verification server 408A. As is discussed below, verification server 408B may perform an identification locally, in which case there is no need to involve identification server 102 in the identification. Additionally, although not shown, it is possible for identification server 102 to forward the response to the identification request to client device 110C without going through verification server 408B, and/or for the identification request received by identification server 102 to be transmitted from client device 110C.

FIG. 4B provides the example of FIG. 4A where client device 110C has switched to verification server 408A using the URL forwarded to it by verification server 408B. In the example shown in FIG. 4B, client device 110C forwards a fingerprint to verification server 408A, and server 408A commences checking the fingerprints from client device 110C to verity that the content being received by client device 110C is "Channel 1" content. In accordance with one or more embodiments, client devices 110A, 110B and 110C are synchronized. By way of a non-limiting example, once client 110C is connected to verification server 408A, it may synchronize with client devices 110A, 110B and 110C by calculating relative time offsets in order to properly align fingerprints for succeeding comparisons.

In the example of FIG. 4B, verification server 408B is servicing a single client device 110D. In accordance with one or more embodiments, verification server 408B may request that identification server 102 find another verification component, which has other client devices available to add client device 110D and perform a verification for client device 110D. Alternatively, either identification server 102 or verification server 408B may perform verification for client device 110D, at least temporarily until another verification component is available to verify client device 110D, e.g., another verification component verifying client devices receiving "Channel 2" content or client device 110D starts receiving content other than "Channel 2" content.

Figure 5:
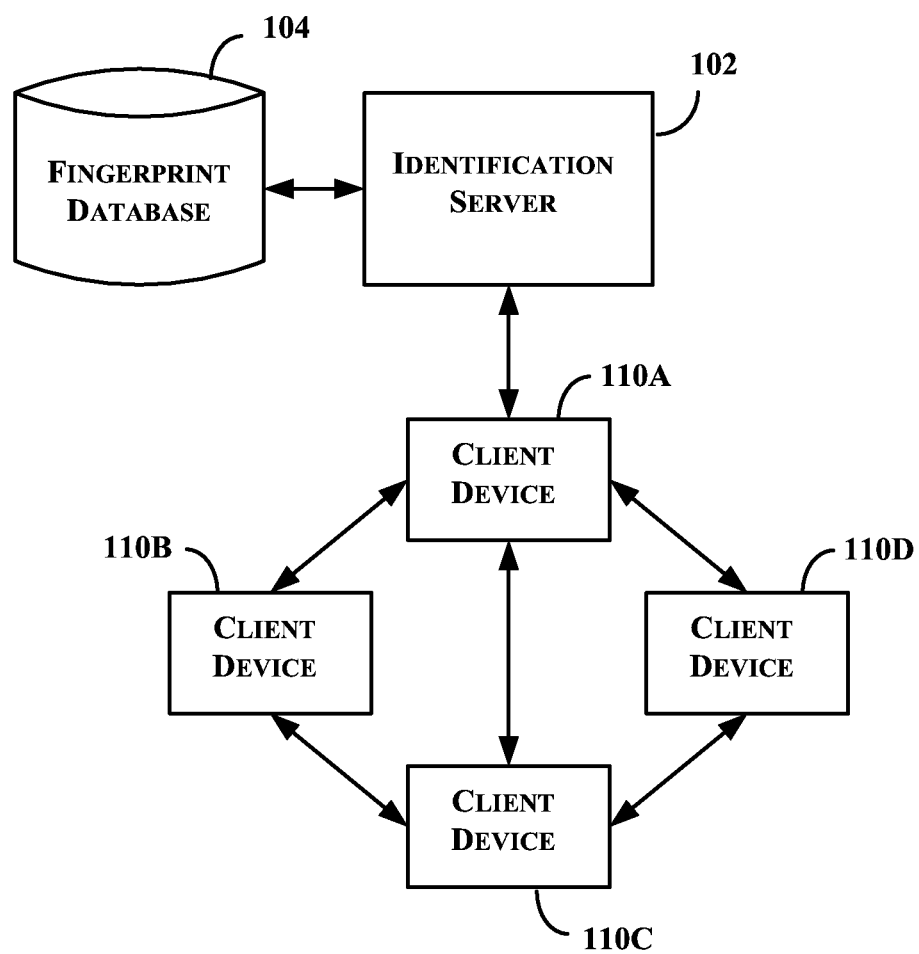

FIG. 5 provides an example of P2P verification in accordance with one or more embodiments of the present disclosure. In the example of FIG. 5, each client device 110 talks with one or more other client devices 110 to perform fingerprint verification. By way of a non-limiting example, such an arrangement may be possible where a peer device is accessible from one or more of its peers on a network, e.g., without a firewall. In the example of FIG. 5, as part of verification, each of client devices 110B and 110D receives fingerprints from, and transmits a fingerprint to, client devices 1110A and 110C. Each of client devices 110A and 110C receives fingerprints from, and transmits a fingerprint to, three client devices. By way of a non-limiting example, any of the client devices may comprise a verification component to provide a verification service for one or more of the other client devices, and/or forward any fingerprints to another client device that has a verification component to perform verification. By way of some non-limiting examples, client device 110B may perform a verification of its fingerprint and the fingerprints received from client devices 110A and 110C, and client device 110A may perform a verification of its fingerprint and the fingerprints received from client devices 110B and 110C. While it is shown in the example, that client device 110A is communicatively connected with identification server 102, in accordance with one or more embodiments where a mismatch is found, one or more of the other client devices may communicate directly with identification server 102 or may communicate indirectly via one or more other client devices in the peer group.

In accordance with one or more embodiments, a verification component may use a lightweight algorithm to compare fingerprints, which algorithm may be implemented using different languages on different platforms, which platforms may include a cloud platform. Implementing verification on the cloud provides an ability to quickly and easily scale verification, and allows large numbers of client devices to be serviced. Such an approach is particularly efficient for monitoring real-time content, such as TV broadcast content. Where the content to be verified is not real-time, such as without limitation content that has a delayed broadcast or that is duplicate content, a fingerprint of the content may be used to search the fingerprint database 104. Where a matching fingerprint exists in the database, the client device may download the reference fingerprint for local verification on the device.

In accordance with one or more embodiments, content verification may be performed without using a local fingerprint database. In such a case, fingerprints may be discarded after verification. Adding a new verification component to the cloud does not require copying or transferring a significant amount of information to the device executing the verification component. In so doing, the verification provided by the cloud may be scaled relatively easily. In an alternate approach, verification components may keep received or generated fingerprints in a local fingerprint database for some period of time. In such a case, the local fingerprint database may be searched and used to verify time-shifted content produced or recorded on other devices. For example, a user may record a program on a DVR and decide to watch this program later. The local fingerprint database stored on a computing device comprising a verification component may be used to verify the delayed stream and handle playback disruptions, which may result from, for example, a user fast forwarding or skipping commercials in recorded content.

In accordance with one or more embodiments, one computing device may handle many content streams, e.g., television channels, and consequently multiple verification groups. By way of a non-limiting example, a computing device may have one or more verification components, which is/are used to service multiple verification groups. When a user switches to another channel, the generated fingerprint becomes out of sync, e.g., fails to match the fingerprints generated by other client devices in the same group. In such a case, before querying an identification server, such as identification server 102, to perform a full search of fingerprint database 104 to locate and identify the new content/channel for the client device, the verification component(s) handling multiple verification groups may first perform a local search of fingerprints provided from other groups to find a local matching group, e.g., the verification component(s) may compare the fingerprint received from a client device in one of the groups to fingerprints provided by client devices in another one or more groups serviced by the verification component(s). Where it is determined that the client device's fingerprint matches fingerprints generated by client devices in another group serviced by the verification component(s), the client device may be added to the new verification group for verification, without involving an identification server 102.

In accordance with one or more embodiments, depending on the number of clients and signal properties multiple verification groups may be used for the same content channel. The signal quality and representation may be different because of signal encoding, number of channels, noise reduction, up- and down-sampling etc. If multiple verification groups matching a client fingerprint exist, the client may be assigned to a verification group which better matches the client content.

In accordance with one or more embodiments, load balancing may be performed to between verification resources. Examples of load balancing include without limitation identifying a number of channels or content streams to be handled, number of verification groups across all content streams being handled and/or within a given content stream that the server is handling, and/or group size. Group size, e.g., the number of client devices in a group, may vary across groups and content. Where a verification group size dips below a given number, the client devices in the group may be assigned to another group, or groups, which may be handled by the same or different verification component. Conversely, where the number of client devices in a verification group exceeds a given number, the client devices may be split into multiple verification groups, which may be handled by the same or different computing device. Reassigning client devices may be determined based on an overall load of one or more verification components. New verification groups may be added or group size of existing groups may be increased to accommodate load increases. In accordance with one or more embodiments, a verification component, e.g., a verification server, may be configured to perform such load balancing. In accordance with one or more embodiments, an identification server may perform load balancing.

In accordance with one or more embodiments, fingerprints may overlap. For example, a client device 110 may reuse a portion of a previous fingerprint, e.g., a last two seconds of the previous fingerprint, append a fingerprint generated from new content e.g., a next four seconds of new content and send the resulting fingerprint, e.g., a six-second fingerprint, for verification. In such a case, it is possible to periodically verify a portion input content stream, e.g., every four seconds for a four second portion, using a fingerprint, e.g., a six-second fingerprint, which is larger than the portion of the input content stream, e.g., verifying a four-second portion by using a six-second fingerprint. A larger fingerprint may provide more reliable results where the input content stream has gaps or silence. Additionally, a larger fingerprint may facilitate synchronization of other client devices, one or more of which may be generating a fingerprint at a slightly different time, e.g., a larger fingerprint increases an overlap in the fingerprints generated by the client devices.

Figure 6:
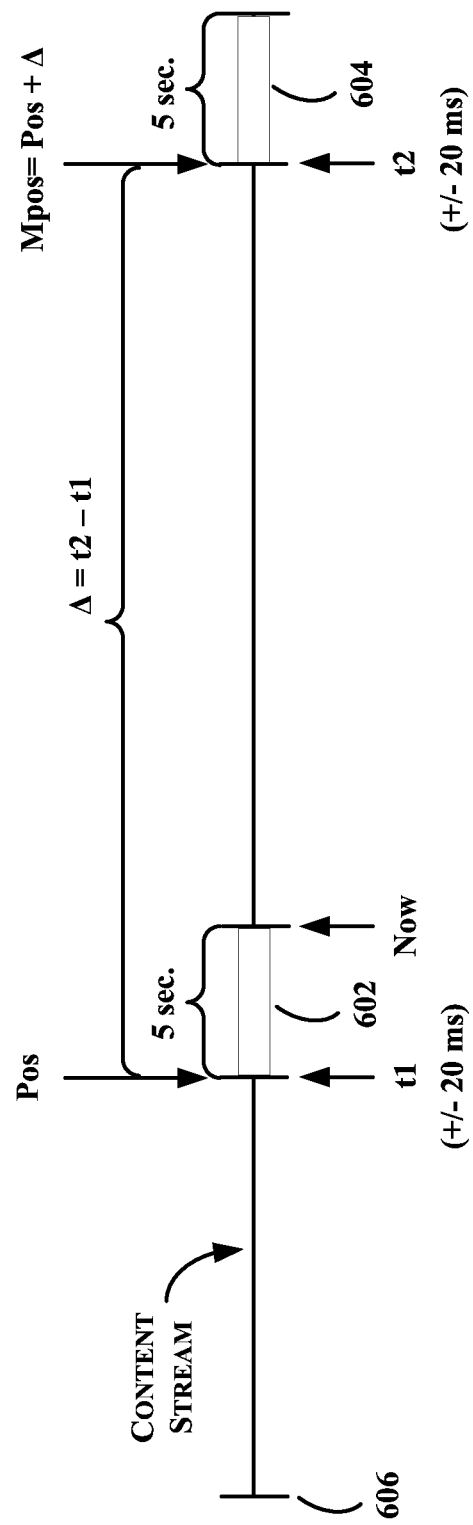

In accordance with one or more embodiments, a timestamp generated by a client device may be sent to an identification server and a subsequent timestamp, which is sent to a verification component, may be determined from the initial timestamp sent to the identification server. FIG. 6 provides an example of initial and subsequent timestamps used in accordance with one or more embodiments of the present disclosure. In the example shown in FIG. 6, a match position of a next fingerprint 604 may be calculated from a match position of a previous fingerprint, e.g., fingerprint 602. Fingerprint 602 may be generated on the client device at a time t1, e.g., a time determined by a clock on the client device. During the identification phase, an identification server finds a matching reference fingerprint at position, Pos, and sends a reference ID associated with the reference fingerprint matching the fingerprint sent by the client device, and a match position, which may be used to identify a timeframe of the fingerprint 602 and the reference fingerprint, back to the requesting device. When a new fingerprint is generated at time t2, the client device calculates a new match position, MPos=Pos+t2−t1, and sends MPos along with the new fingerprint to a verification component. Instead of performing a full search of a reference fingerprint database for a reference fingerprint, a verification component may compare the fingerprint with a reference fingerprint associated with position MPos of the identified content. A match indicates that the client device continues to be receiving the identified content. Where the verification fails, e.g., a match is not found, the verification component may transmit the fingerprint to an identification server to identify the content that is being received by the client device.

Figure 7:
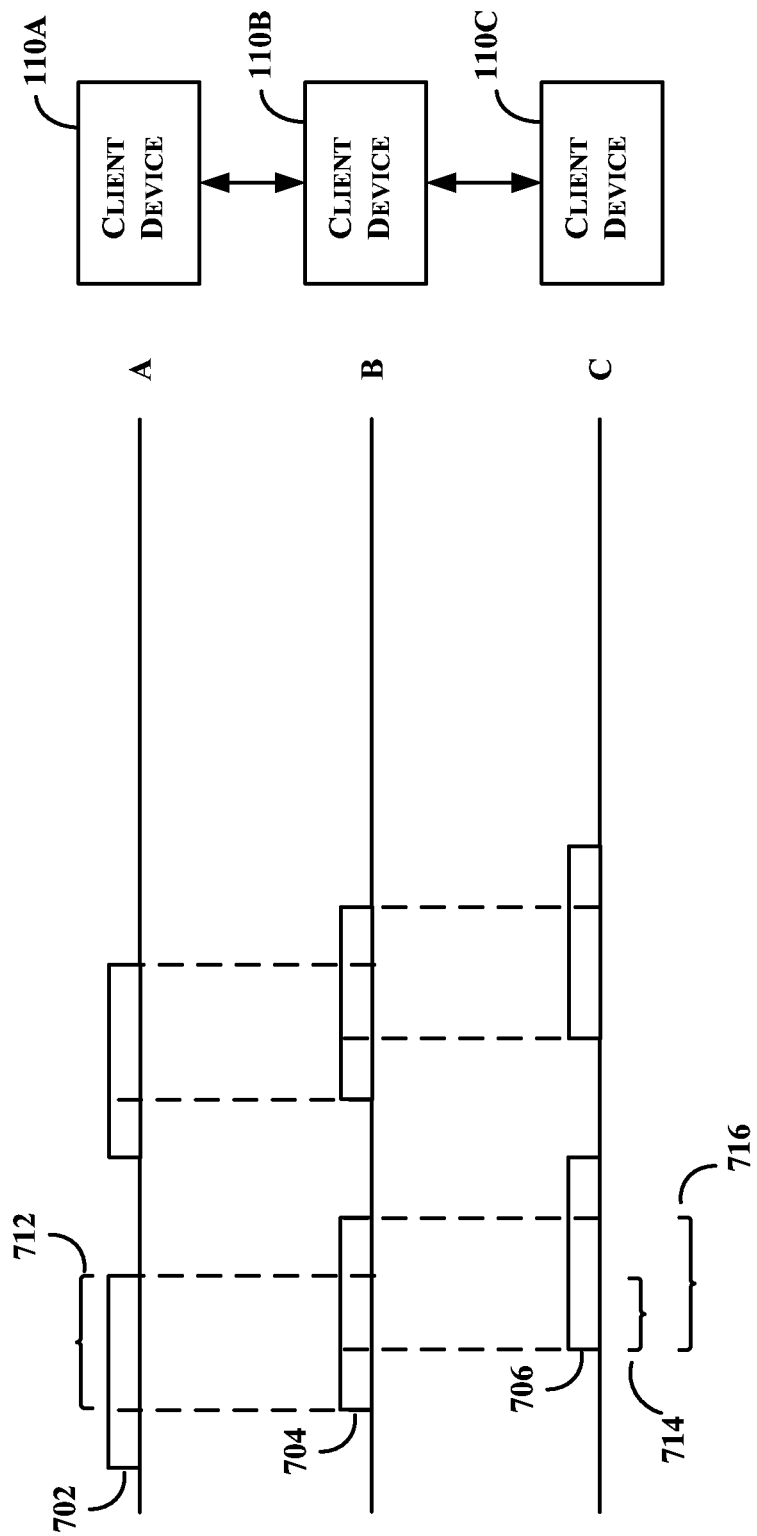

As is discussed above, peer client devices may be connected in different ways. In accordance with one or more embodiments, a connection arrangement may be determined as part of synchronization. FIG. 7 provides an example in which client devices of a group of peers are connected using determined fingerprint overlaps in accordance with one or more embodiments. In the example of FIG. 7, fingerprints 702, 704 and 706 are determined at offsetting times by client devices 110A, 110B and 110C, respectively. Fingerprint 702 overlaps some portion of both fingerprints 704 and 706. As such, it may be said that fingerprints 702, 704 and 706 have at least a portion of its fingerprints in common. In accordance with one or more embodiments, client devices 110A, 110B and 110C may be connected to optimize an amount of an overlap for purposes of verification, such that client device 110A is connected to client device 110B, rather than to client device 110C, and client device 110B is connected to client device 110C. The arrangement maximizes the fingerprint overlaps for purposes of verification, since an overlap 712 between fingerprints 702 and 704 is greater than an overlap 714 between fingerprints 702 and 706, and an overlap 716 between fingerprints 704 and 706 is greater than overlap 714.

Figure 8:
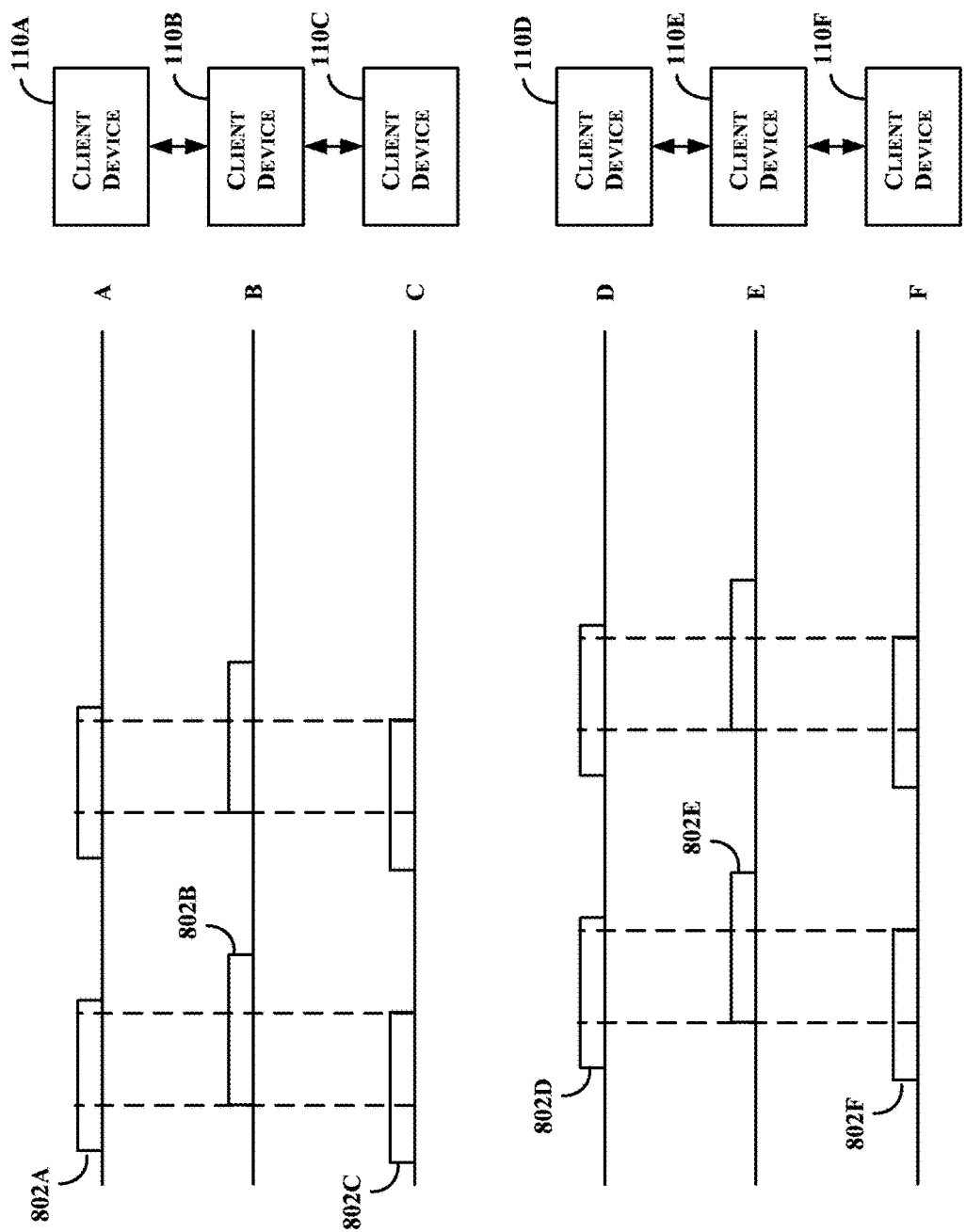

In accordance with one or more embodiments, synchronization may result in client devices being split into more than one verification group. FIG. 8 provides an example of splitting client devices into multiple groups during synchronization in accordance with one or more embodiments of the present disclosure. While client devices 110A-110F are identified during an identification phase to be receiving the same content stream, during synchronization, client devices 110A, 110B and 110C are assigned to one verification group, and client devices 110D, 110E and 110F are assigned to another verification group, based on determined fingerprint overlaps. In the example of FIG. 8, there is little, if any, overlap between fingerprints 802A and 802E and/or between fingerprints 802C and 802E. There is a considerable overlap, relatively speaking, between fingerprints 802A, 802B and 802C. Likewise, there is a considerable overlap, relatively speaking, between fingerprints 802D, 802E and 802F. Based on the overlaps or lack thereof, during synchronization, client devices 110A and 110C are grouped together along with client device 110B in one group, and client devices 110D and 110F are grouped together along with client device 110E in another group. As discussed herein, in an alternative approach, client devices 110A-110F may be instructed to alter the timing for generating a fingerprint, in order to more closely align the fingerprints generated by each client device, so that the client devices 110A-110F may all be grouped together in a single verification group.

Figure 9:
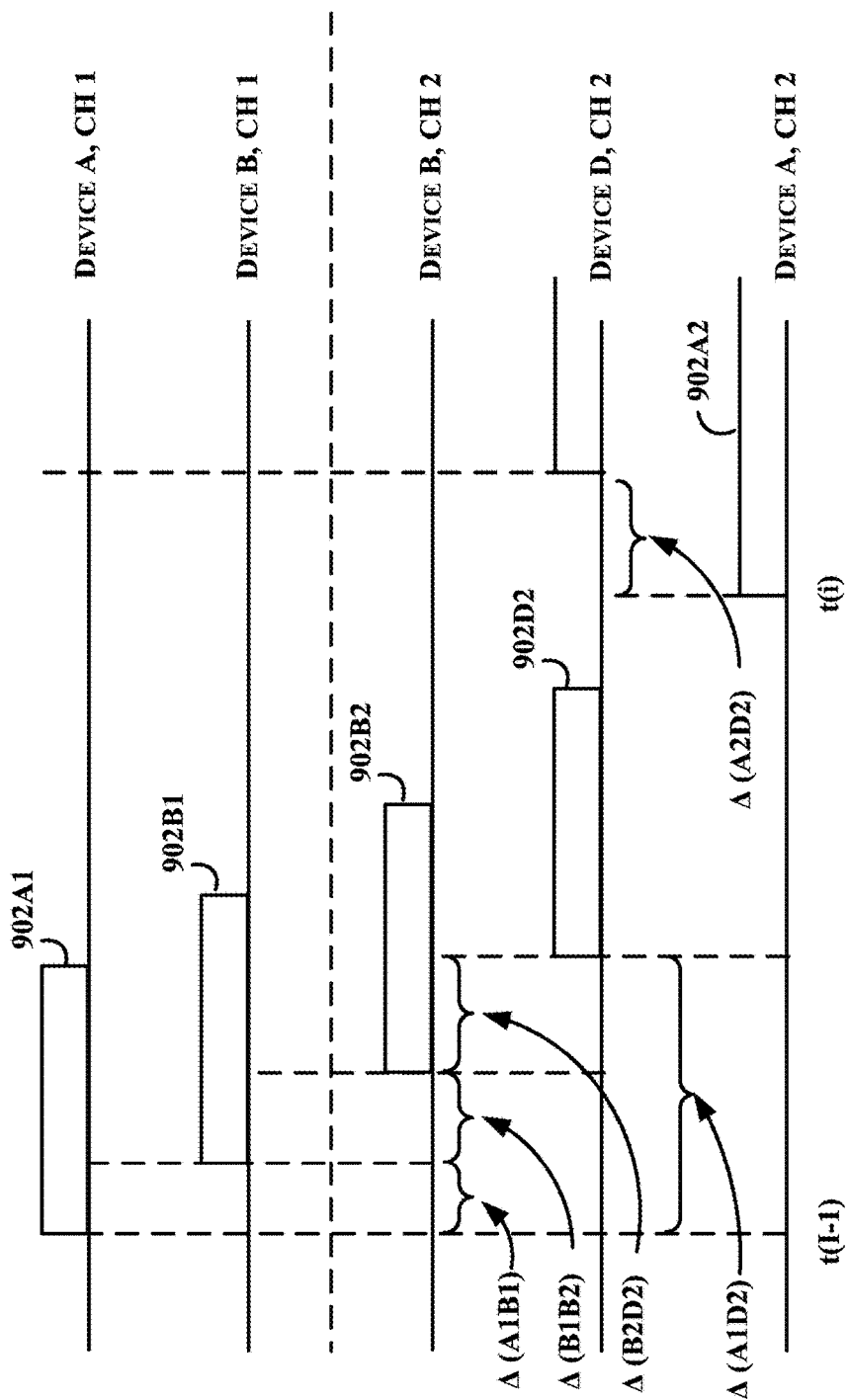

In accordance with one or more embodiments, a client device receiving multiple channels, e.g., such as a double-channel DVR, may join multiple verification groups and provide time synchronization between these groups, as illustrated in FIG. 9. In the example, device B has an ability to receive two channels, and is receiving and generating fingerprints for two channels, CH1 and CH2, respectively. Initially, device A is receiving channel, CH1 and belongs to a verification group with device B, which is providing fingerprints generated from content of channel CH1. Additionally, in the example, device D is receiving and generating fingerprints using content from channel CH2 and belongs to a verification group with device B, which is providing fingerprints generated from content of channel CH2. Device B is synchronized with both device A and device D. Each of fingerprints 902A1, 902B1, 902B2, 902D2 and 902A2 has a timestamp, e.g., a recording timestamp. A difference between the timestamps for fingerprints 902A1 and 902D2 can be determined from the timestamps for fingerprints 902A1, 902B1, 902B2 and 902D2, e.g., $\Delta A1D2 = \Delta A1B1 + \Delta B1B2 + \Delta B2D2$. In the example, device A switches from CH1 to CH2 and is able to synchronize with device D and calculate a new match position A2D2. In a case of continuous mode, e.g., where device A continually generates a fingerprint at a same interval, the new match position A2D2 may be determined to be equal to $t(i) + \Delta A2D2$, where $\Delta A2D2 = \Delta A1D2$. Where continuous fingerprint generation, or recording, is interrupted at device A, e.g., as a result of the switch from CH1 to CH2, $\Delta A2D2$ may be determined to be equal to $\Delta A1D2 + \Delta A1A2$, where $\Delta A1A2$ is time required for device A to switch from CH1 to CH2.

Fingerprint Database

In accordance with one or more embodiments, a device, such as an identification server 102, uses a fingerprint database for identification, and a verification component may use a fingerprint database for verification. In accordance with one or more embodiments, new fingerprints may be continuously added, e.g., in small increments, to the fingerprint database as content is being broadcast, for example. In accordance with one or more embodiments, a server other than the identification server and/or verification component may be used to receive new fingerprints for a given content stream, and store the new fingerprints in a fingerprint database. The server may also maintain data associated with the fingerprints, such as metadata or other data about the content from which the fingerprints are generated. In the examples discussed below, fingerprints associated with a single content stream are discussed. It should be apparent that a fingerprint database may comprise fingerprints for multiple content streams.

In accordance with one or more embodiments, fingerprints may be generated continuously, e.g., in a continuous mode, for an input content stream 116. A frame, or portion of the content stream 116, used to generate a fingerprint may have a certain length or size, commence at a starting position, such that a portion of the content used to generate a fingerprint commences at the starting position. A next starting position may be based on an increment size. In continuous mode, a fingerprint is generated on a continuous basis. By way of a non-limiting example, an increment size may be less than a frame size, e.g., an increment size that comprises a sub-fingerprint frame, and may depend on a desired time resolution. For example, a fingerprint frame size may be 5 seconds in length, and a fingerprinter, a component generating a fingerprint using content, may produce 1 second sub-fingerprints, which are sent to the server for inclusion in the fingerprint database. When a server receives a fingerprint, it stores the fingerprint and metadata in a fingerprint database and updates a database index.

Figure 10:
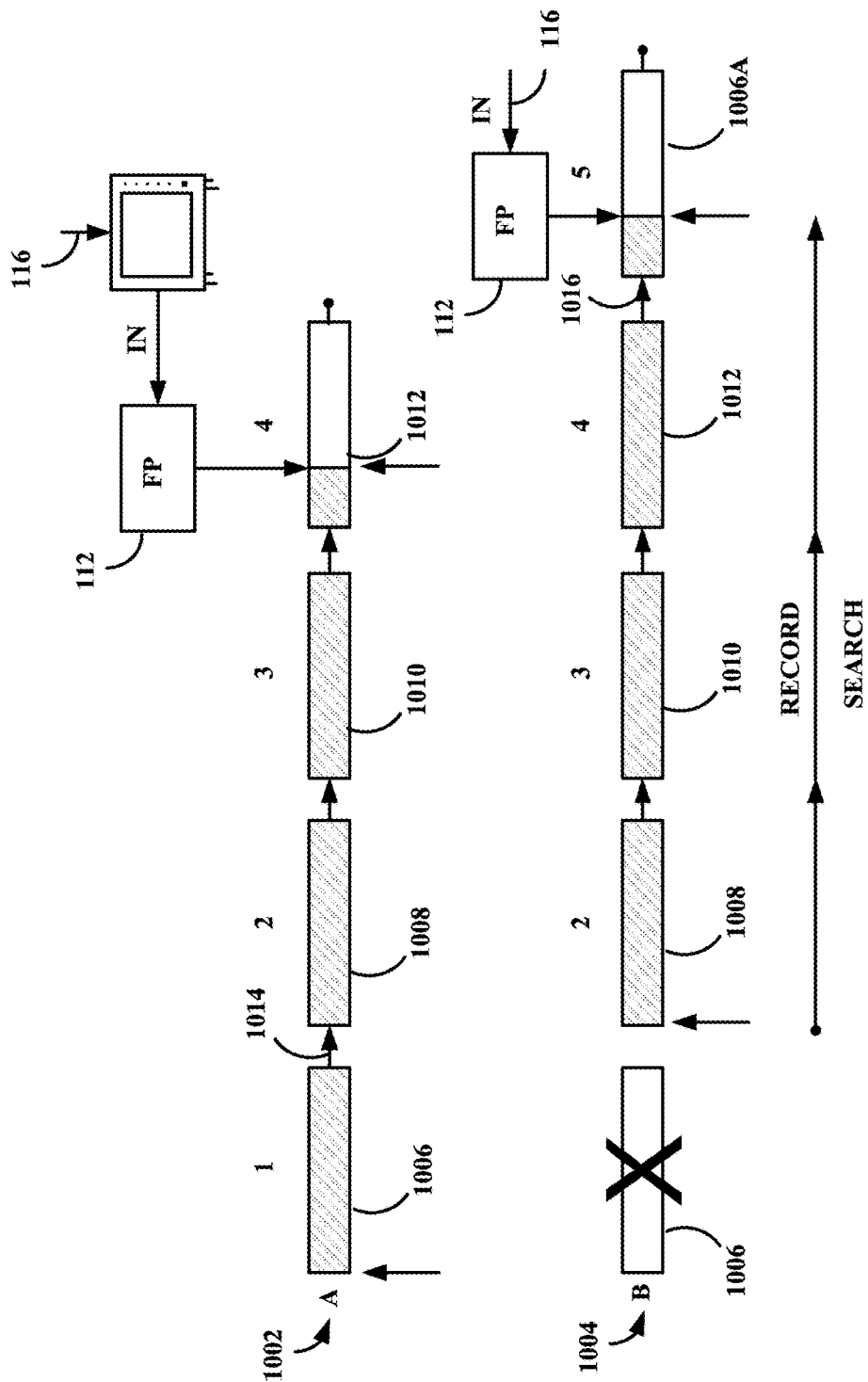

FIG. 10 provides an example of fingerprint database storage in accordance with one or more embodiments of the present disclosure. In the example of FIG. 10, for a given content stream, a fingerprint database may be a fragmented database comprising a plurality of segments, such as segments 1006, 1008, 1010 and 1012, which may be linked together, e.g., as a linked list. When a segment becomes full, another segment may be added. When a size capacity is reached such that another segment may not be added, a segment storing older fingerprints, e.g., fingerprints with less recent timestamps relative to other segments of the database, may be removed to make room for another segment, or the segment may be overwritten with new fingerprints. In the latter case, fingerprints and corresponding indices may be stored in a circular fashion, where the new fingerprint segment overwrites earlier data. By way of a non-limiting example, a snapshot 1002 includes segments 1006, 1008, 1010 and 1012, with segment 1006 storing the older fingerprints relative to the other segments. Space remains in segment 1012 for storing new fingerprints. In snapshot 1004, segment 1012 is full. In accordance with one or more embodiments, segment 1006 and corresponding link 1014 may be deleted to make room for a new segment 1006A. Alternatively, segment 1006A may be the same segment as segment 1006, with a new link 1016, in place of link 1014, linking segment 1012 and segment 1006A. In the example shown in FIG. 10, fingerprints are added and searched in the same direction, from oldest to newest.

In accordance with one or more embodiments, instead of adding another segment or overwriting an existing segment when the database becomes full, a new server may be added to the system to handle new content and the old database may be optimized for read-only operation and optionally moved to another server.

Figure 11:
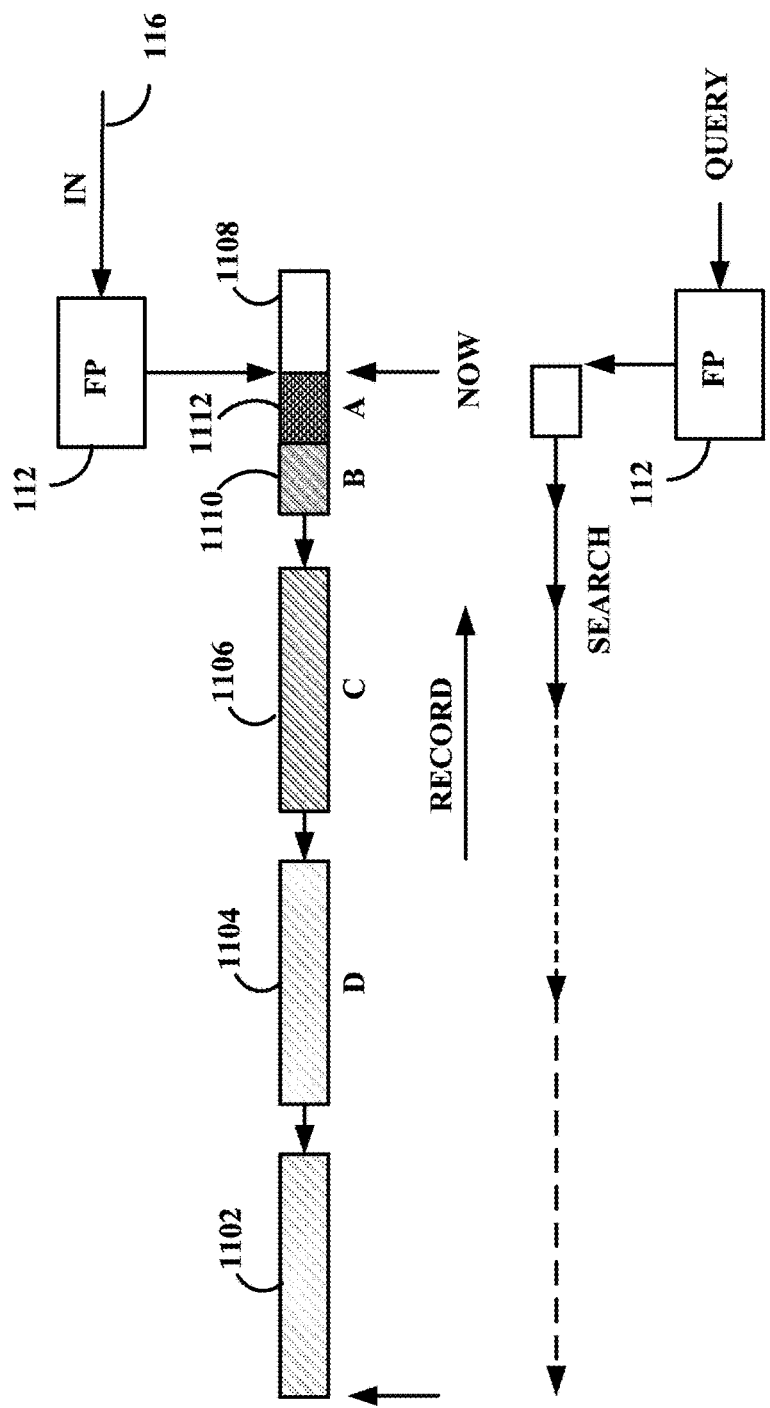

FIG. 11 provides another example of fingerprint database storage in accordance with one or more embodiments of the present disclosure. In accordance with one or more embodiments, instead of adding new fingerprints to the end of a fingerprint sequence, new fingerprints and indices may be added to the beginning of the list. In the example shown in FIG. 11, the most recent fingerprint 1112 is stored, or recorded, before the next most recent fingerprint 1110 in the most recent segment 1108 at the beginning of the linked list. In addition to storing new fingerprints at the beginning of the list, a search may be performed from the beginning of the list, which has the newer fingerprints and is more likely to contain the query fingerprint. By way of a non-limiting example, a search may be performed, by for example identification server 102, by processing the most recent fingerprints first, e.g., fingerprints stored in segment 1108, and the search may be stopped when a match is found. For each segment searched, an accuracy, e.g., a number of index-bit permutations, may depend on an age of the fingerprints stored in the segment, such that less effort is used to search the segments storing the older fingerprints. In the example shown in FIG. 11, the least amount of effort may be used to search segment 1102, followed by segment 1104, etc., with the most effort being used to search segments 1108 and 1106.

Figure 12A:
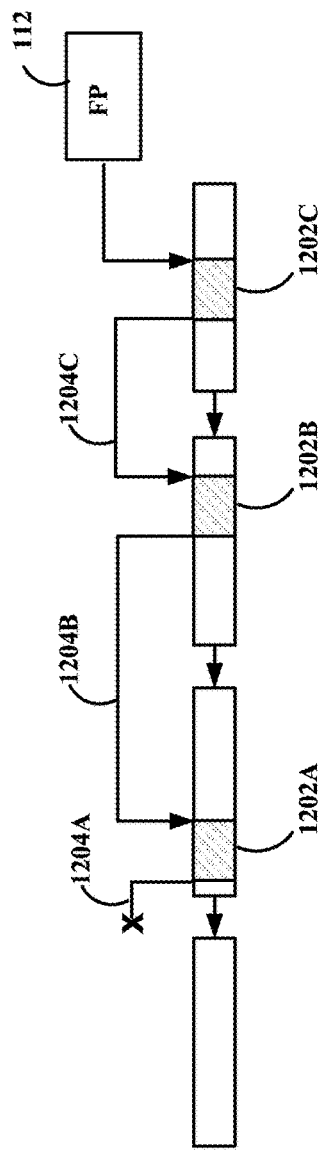

When a new fingerprint is inserted in a database, a search may be performed to locate any duplicates. Where a duplicate is detected its location may be identified in a new entry in a fingerprint index, and the old duplicate fingerprint may be removed from the index. FIG. 12, which comprises FIGS. 12A and 121B, provide an example of duplicate fingerprints and a fingerprint index in accordance with one or more embodiments.

With reference to FIG. 12A, a linked list of fingerprint segments comprising fingerprints 112 includes three duplicate fingerprints 1202A, 1202B and 1202C. By way of a non-limiting example, the fingerprints may be generated from a commercial that may be shown at different times and on different channels. In the example, links may be used to link duplicate occurrences of a fingerprint, e.g., fingerprint 1202C is linked to fingerprint 1202B via link 1204C, fingerprint 1202B is linked to fingerprint 1202A via link 1204B, and link 1202A is a null link indicating that fingerprint 1202A is the last known duplicate occurrence of the fingerprint.

Figure 12B:
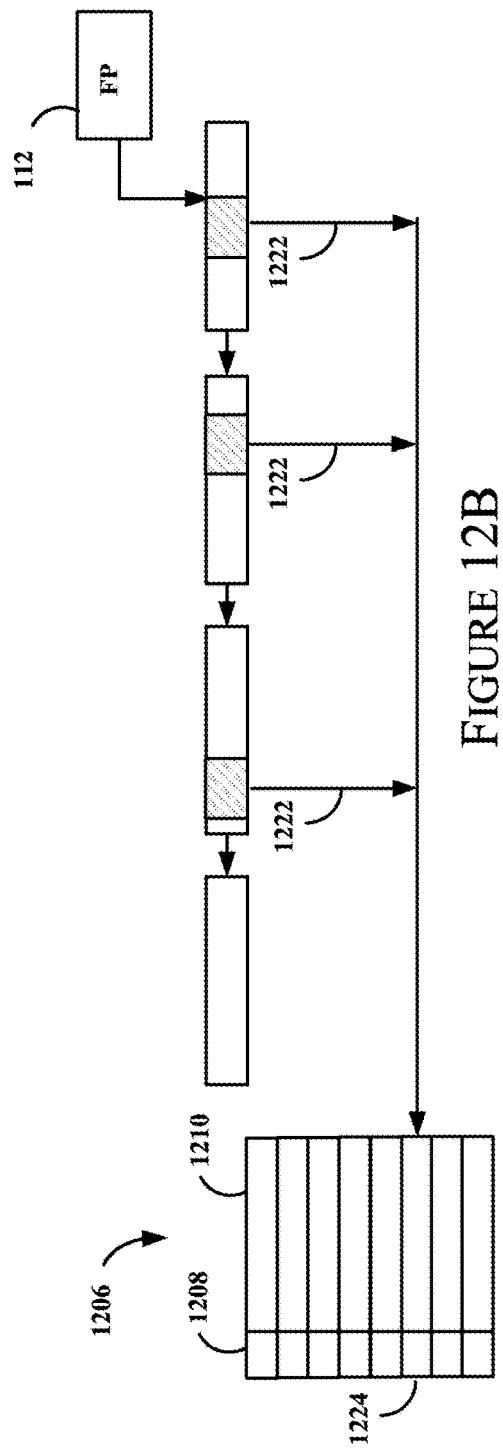

Each occurrence may have a unique identifier (ID), which may be used to identify a row in an index. An example of an index 1206 is shown in FIG. 12B. A unique ID associated with an occurrence of a fingerprint might be stored in field 1208 of index 1206. Typically, each row of index 1206 corresponds to a fingerprint. In a case of duplicate occurrences of a fingerprint, a row may correspond to all duplicate occurrences of a fingerprint, or a row in index 1206 may correspond to fingerprint 1202C, and may indirectly correspond to the other occurrences of the fingerprint, such as via links 1204C and 1204B. Each row in index 1206 may include a metadata field 1210, which may include descriptive information about the content or a portion of the content represented by the fingerprint associated with the row. Metadata may include one or more timestamps, such as without limitation a beginning and ending timestamp.

In accordance with one or more embodiments, during a search of the fingerprint database to locate a fingerprint during the identification phase, rather than looking for all possible matches for a query fingerprint, the search may be stopped when it finds the first (the most recent) match. All matches with older reference content could be obtained, e.g., using links 1204, 1204B and 1204C of FIG. 12A.

FIG. 12B illustrates an alternative approach to using links 1204A, 1204B and 1204C to link duplicate fingerprints. In the example of FIG. 12B, each occurrence of the duplicate fingerprint has an associated pointer 1222 that points to a same record of index 1206.

Figure 13:
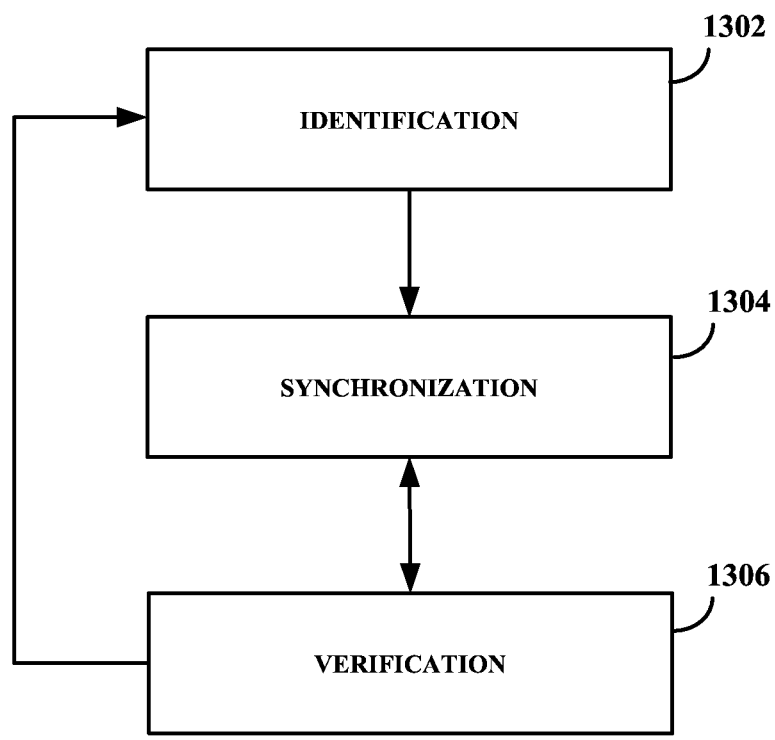

As discussed above, embodiments of the present disclosure use identification, synchronization and verification. FIG. 13 provides a process overview, which includes identification, synchronization and verification, in accordance with one or more embodiments. Identification 1302 is typically performed by an identification server, such as identification server 102, using a reference database of fingerprints, such as fingerprint database 104. The same or another device may be used perform synchronization 1304. An example of another component that may perform synchronization is a verification server 408A. Verification 1306 is performed where content is successfully identified in the identification step 1302 and a client device's fingerprint generation is synchronized with the other client devices that together form a verification group. It may be possible that the synchronization 1304 may be repeated for a client device, such as without limitation the client device is to be assigned to another verification group. Additionally, it may be necessary to repeat identification 1302, such as without limitation where the client device switches to another input content stream.

Figure 14:
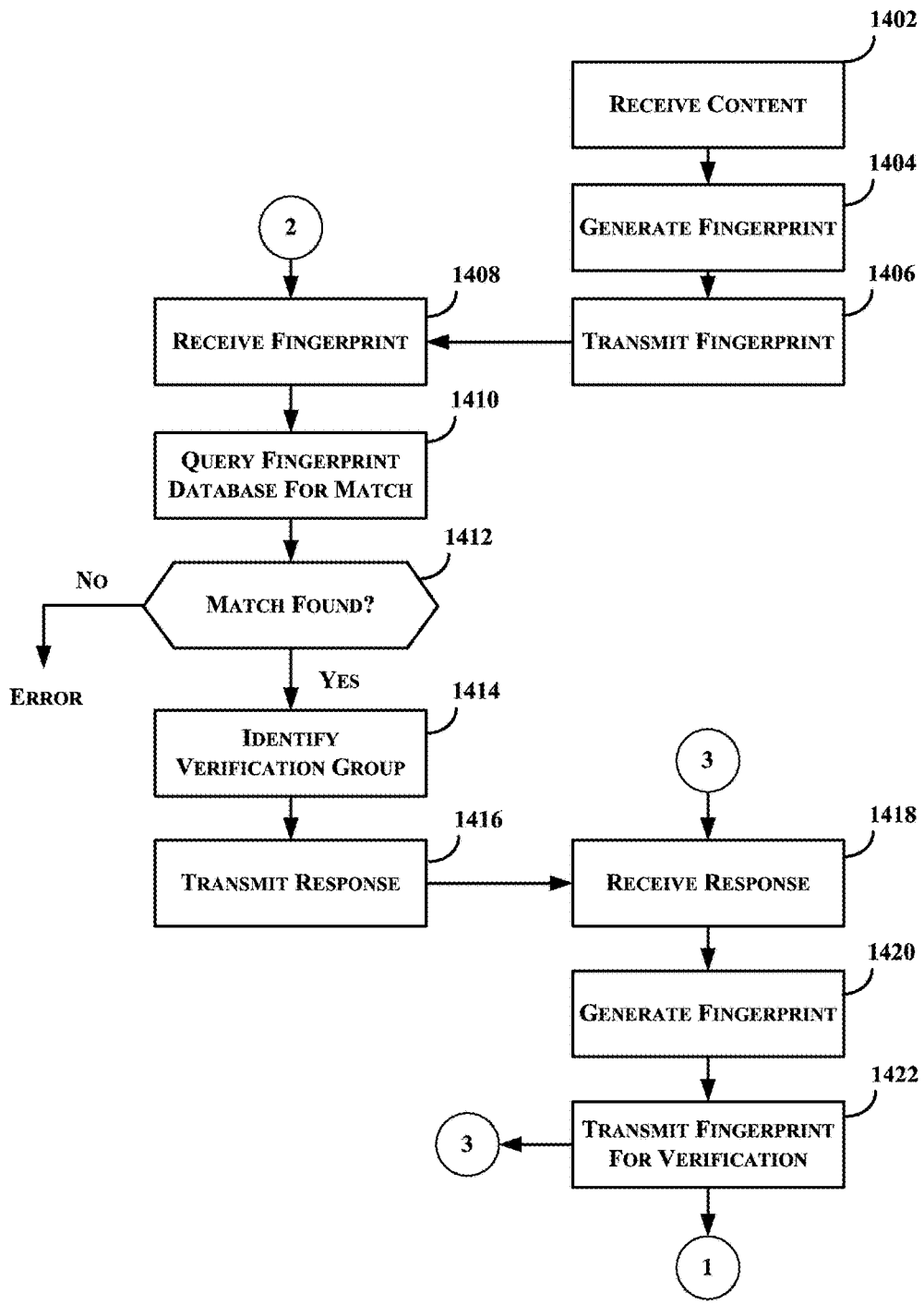

FIG. 14 provides a process flow example including intercommunication between an identification server and a client device in accordance with one or more embodiments. At step 1402, a client device receives an input content stream, and at step 1404 the client device generates a fingerprint using at least a portion of the received input content stream. At step 1406, the client device transmits the fingerprint as part of an identification request or query to an identification server.

At step 1408, the identification server receives the fingerprint, and searches the fingerprint database for a reference fingerprint matching the received fingerprint. A determination is made at step 1412 whether or not a match is found. If a match is not found, this may result in an error. As is discussed below, content may be identified and continuously verified in order to generate an event related to the content. Where a match is not found, it may be necessary to wait to generate such an event until a match can be found.

Where a match is found, processing continues to step 1414 to determine a verification group for the client device. As discussed herein, the verification group comprises client devices that are all receiving the same content and whose fingerprints are in synchronization. In the examples of FIG. 14, the identification server may perform synchronization. At step 1116, the identification server forwards a response to the client device. As discussed herein, the response includes information identifying a computing device that has a verification component, to which the client device is to forward its fingerprints for verification.

At step 1418, the client device receives a response to its identification request. At steps 1420 and 1422, the client device begins generating and sending a fingerprint for verification to the verification component executing on the computing device identified in the response. In accordance with one or more embodiments, as illustrated by the processing loop from step 1422 to 1418, the client device begins generating continuous fingerprints. At step 1422, each fingerprint is transmitted to the verification component for verification, which is described in connection with FIG. 15.

Figure 15:
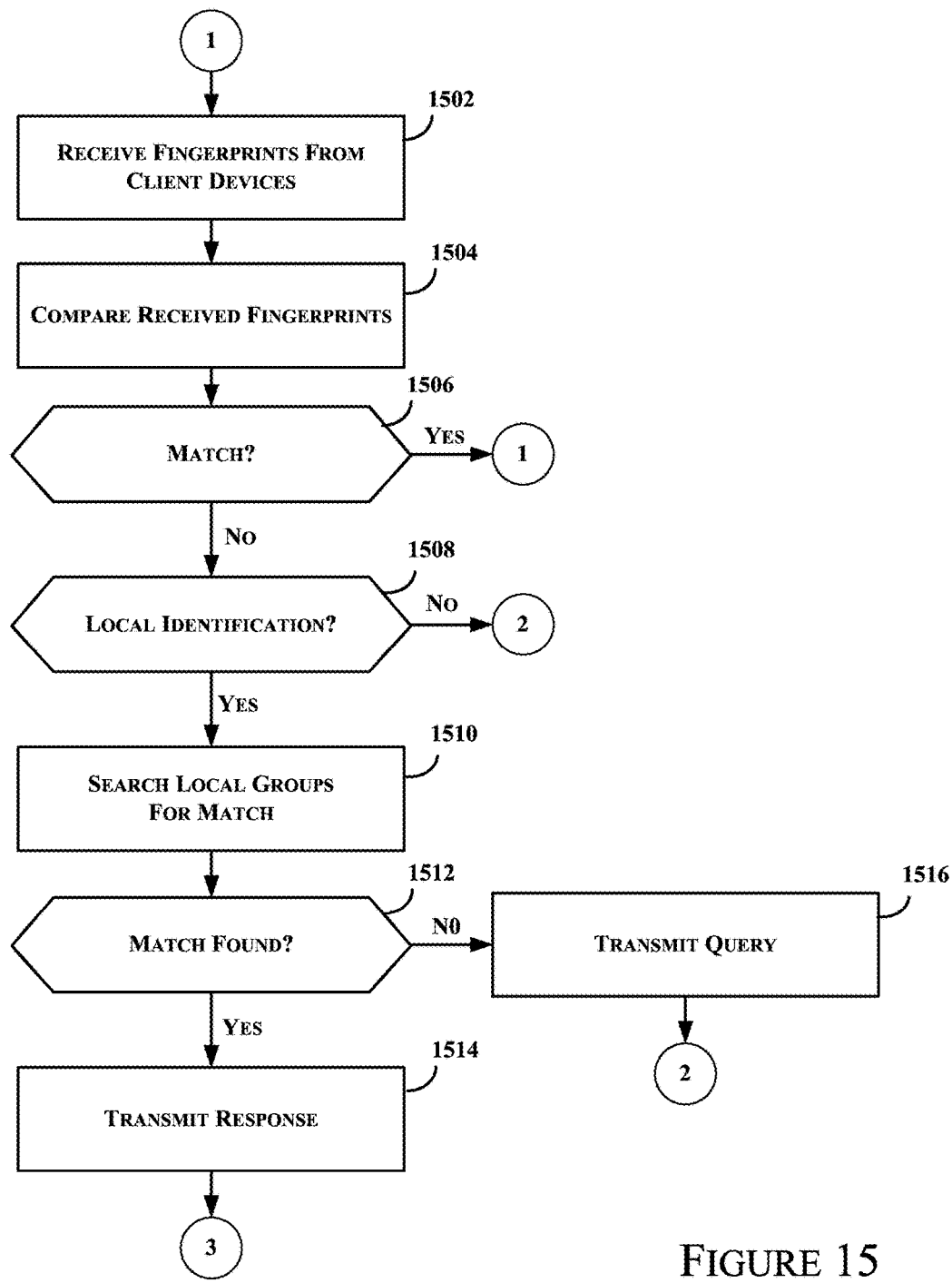

FIG. 15 provides an example of a verification process flow in accordance with one or more embodiments of the present disclosure. The verification process flow may be performed by a verification component executing on a computing device, e.g., client computing device, server computer, etc. At step 1502, a verification component, such as verification server 408, a verification component on client device 110C or a verification component provided by a cloud computing service/provider, receives fingerprints from each of the client devices that form a verification group being serviced by the verification component. At step 1504, the verification component compares the received fingerprints, or a portion of each of the received fingerprints, to determine whether or not they match. If a match is found, the verification component may continue its processing at step 1502 and await further fingerprint transmissions from the client devices in the verification group. As discussed herein, the computing device executing the verification component may service more than one verification group. In such a case, the process shown in the example FIG. 15 may be repeated for each verification group.

If it is determined, at step 1506 that there is at least one fingerprint that does not match, processing continues at step 1508 to determine whether or not the verification component is able to perform content identification locally. By way of a non-limiting example, where the computing device having the verification component services more than one verification group, the verification component may compare the one or more fingerprints that did not match from the current verification group to fingerprints received in connection with one or more other verification groups serviced by the verification component. Where a match is found and it is possible to synchronize the fingerprint generation of the perspective new client device with the client devices already in the other verification group, the verification component may assign the perspective client device to the new verification group locally without requesting an identification server to perform the identification. In accordance with one or more embodiments, a computing device that services more than one verification group may execute a single verification component servicing the one or more verification groups. Alternatively, the computing device may execute multiple verification components, each of which may service one or more verification groups. In the example described below, one verification component services multiple verification groups.

At step 1508, where the verification component services more than one verification group of client devices, processing may continue at step 1510. Otherwise, the verification component may transmit the fingerprint to an identification server to identify the content and assign the client device to a new verification group.

Where processing continues at step 1510, the verification component searches its local verification groups in an effort to locate a verification group comprising client devices generating fingerprints that match the client device's fingerprint. A determination is made whether or not a match is found. If not, the verification component may transmit the fingerprint to an identification server to identify the content and assign the client device to a new verification group. If a match is found and the fingerprints are able to be synchronized, the verification component may send a response to the client device, which response may indicate that the verification group has changed.

In accordance with one or more embodiments, a client device's input content stream may be identified in order to identify one or more events related to the input content stream, which may enrich a user's experience of the content.

In accordance with one or more embodiments, one or more identification servers may be used to track content changes at client devices, while other resources, such those computing devices executing verification components, may be used to verify content in between such content changes. Verification components may be used to verify content between identifications to make sure client devices forming a verification group are still watching the same channel/content. At the same time, another server, may sample, e.g., listen, to the same content being received by client devices, and may identify the content using one or more techniques, including without limitation audio, video, closed caption, object recognition, OCR, voice recognition, user comments, etc. When an event is identified, such as a program, commercial, new product, related information etc. event, an event server may send a notification to all client devices receiving related content. Additionally, when the event notification is sent to the client, a notification message may include a small reference fingerprint corresponding to the event. The client device may use this fingerprint as an additional verification, locally, that it is still receiving the same content. The additional local verification acts to improve robustness and precision and eliminate inconsistencies in the event served to a client device and the content that is currently being received and experienced at the client device. By way of a non-limiting example, such an inconsistency may be due to communication delays/latencies, such as may occur in a case that the user switches to other content, and the switch has not yet been detected during verification by a verification component. Such a delay may be caused by communication delay or verification granularity, e.g., a fingerprint being generated every minute using a five second portion of the content and then waiting fifty-five seconds until the next fingerprint is generated.

Content identification provided in accordance with one or more embodiments disclosed herein may be used in Broadcast Interactivity ("BI") applications, which may make use of an ability to "know what the user is watching" to enrich the user's experience. Methods, e.g., asynchronous methods, may be provided to developers, which allow them to link media at specific time stamps to events that trigger with their own code execution path. This allows the end user to interact in real time with "software related to the broadcast", enabling a more engaging experience to the user. By way of some non-limiting examples, this may be useful not only for targeted publicity and ads placement but also for sectoral user base sensing, social check-in over media content, shopping/selling products. Using BI, a vast array of different levels of interactivity may be developed.

In one example content, BI provides an ability to "know/ guess" what the user is experiencing, e.g., watching and/or listening to, and offer different engagement interactivity related to the content, such as without limitation running related widgets, polls, voting, rating, etc. In one such scenario, the user may be prompted to interact with interactive component that is complimentary to and in synchronization with the live broadcast content being received by the user's client device.

In another scenario, the user may be prompted over pre-ingested commercials. A commercial owner delivers a copy of a commercial video/audio, which content may be "fingerprinted". A client device may pre-load fingerprints cached at boot time. When the commercial content is played using the client device, at any time or instance (real-time broadcast or DVR'ed for instance), the content may be found and matched at the client device directly without a need to involve an identification server, for example. Where a "match" occurs, the client device may be configured to contact a backend infrastructure that will deliver an "event" that needs to happen to the user, which usually triggers a prompt in the TV set that the user can acknowledged or not (impression or click in ads terminology). If the user accepts, we could run related apps on the television, polls, voting, rating, etc. . . . .

Figure 16:
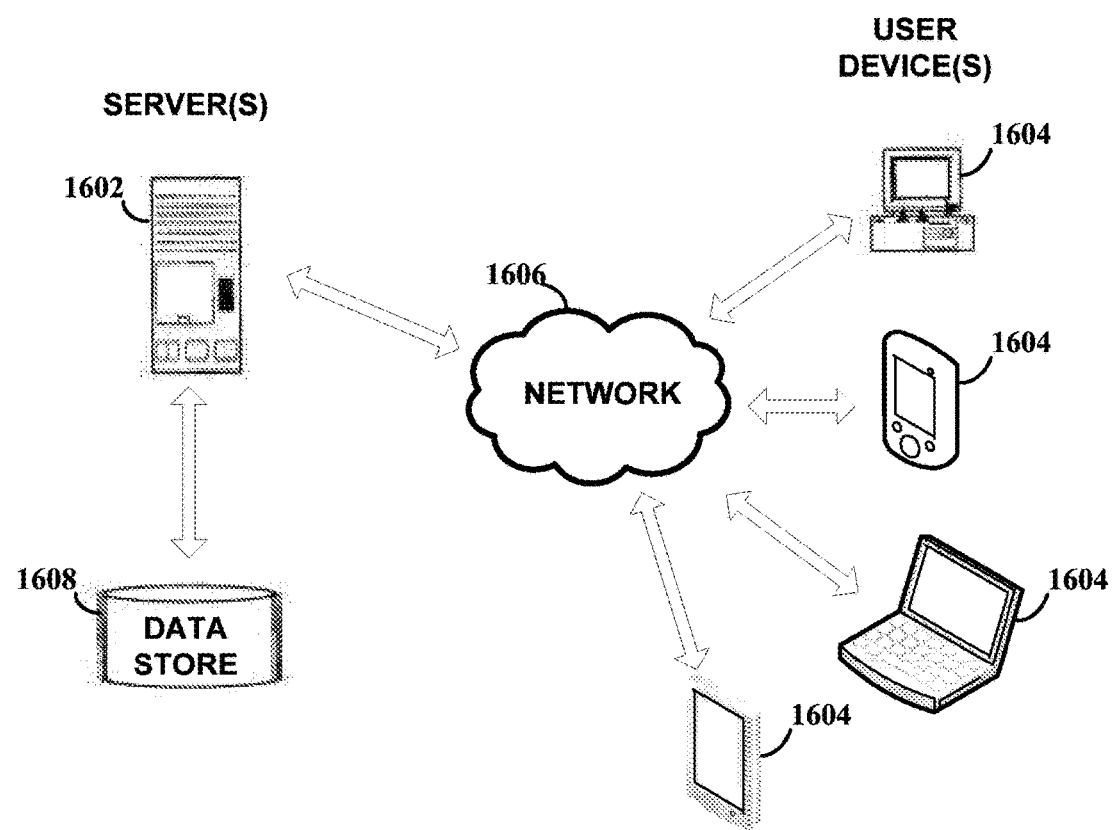
FIG. 16 illustrates some components that can be used in connection with one or more embodiments of the present disclosure.

FIG. 16 illustrates some components that can be used in connection with one or more embodiments of the present disclosure. In accordance with one or more embodiments of the present disclosure, one or more computing devices, e.g., one or more server computers, client devices or other computing device, are configured to comprise functionality described herein. For example, a computing device 1602 can be configured to execute program code, instructions, etc. to provide functionality in accordance with one or more embodiments of the present disclosure.

Computing device 1602 may service one or more computing devices 1604. In accordance with one or more embodiments, computing devices 1604 may be client devices, and computing device 1602 may comprise an identification server, which provides an identification service, or computing device 1602 may be a computing device, which provides a verification component to computing devices 1602. In accordance with one or more embodiments, the verification component may be a verification server, which need not generate a fingerprint and instead verifies fingerprints provided by computing devices 1604.

In accordance with one or more embodiments, computing device 1602 may serve content to one or more computing devices 1604 using a browser application via a network 1606.

Data store 1608 may be used to store data such as without limitation reference database 104, index 1206, program code to configure a server 1602 to perform functionality in accordance with one or more embodiments, etc.

The user computing device 1604 may be any computing device, including without limitation a personal computer, personal digital assistant (PDA), wireless device, cell phone, internet appliance, media player, home theater system, and media center, television, DVR, set top box, cable/satellite receiver, or the like. For the purposes of this disclosure a computing device includes a processor and memory for storing and executing program code, data and software, and may be provided with an operating system that allows the execution of software applications in order to manipulate data. A computing device such as server 1602 and the user computing device 1604 can include one or more processors, memory, a removable media reader, network interface, display and interface, and one or more input devices, e.g., keyboard, keypad, mouse, etc. and input device interface, for example. One skilled in the art will recognize that server 1602 and user computing device 1604 may be configured in many different ways and implemented using many different combinations of hardware, software, or firmware.

In accordance with one or more embodiments, a computing device 1602 can make a user interface available to a user computing device 1604 via the network 1606. The user interface made available to the user computing device 1604 can include content items, or identifiers (e.g., URLs) selected for the user interface in accordance with one or more embodiments of the present invention. In accordance with one or more embodiments, computing device 1602 makes a user interface available to a user computing device 1604 by communicating a definition of the user interface to the user computing device 1604 via the network 1606. The user interface definition can be specified using any of a number of languages, including without limitation a markup language such as Hypertext Markup Language, scripts, applets and the like. The user interface definition can be processed by an application executing on the user computing device 1604, such as a browser application, to output the user interface on a display coupled, e.g., a display directly or indirectly connected, to the user computing device 1604.

In an embodiment the network 1606 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 8. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 17:
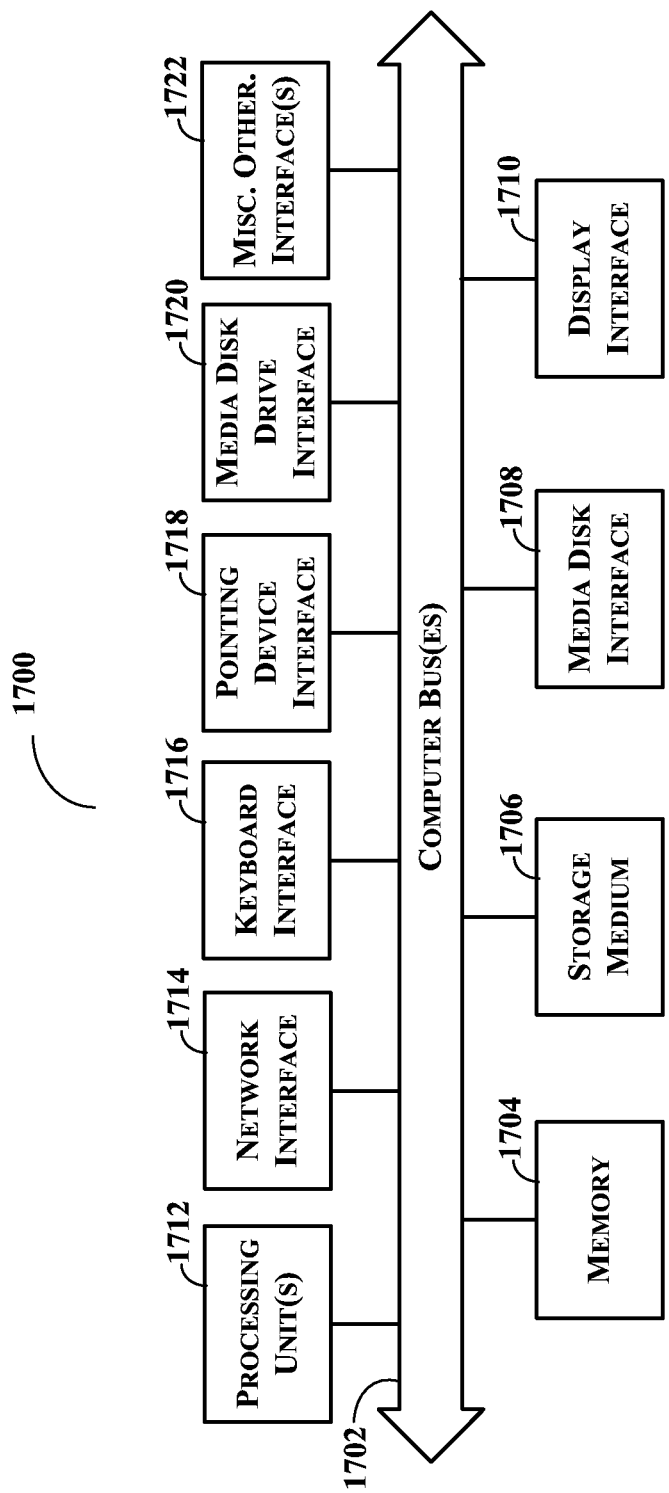
FIG. 17 is a detailed block diagram illustrating an internal architecture of a computing device in accordance with one or more embodiments of the present disclosure.

FIG. 17 is a detailed block diagram illustrating an internal architecture of a computing device, e.g., a computing device such as server 1602 or user computing device 1604, in accordance with one or more embodiments of the present disclosure.

In accordance with one or more embodiments, a computing device may have one or more means to capture/receive media content. To record audio/video content, the device may use a microphone, video camera, TV/ratio tuner, audio/video capture card, sound card, analog audio input with analog-to-digital converter, modem, digital media input (HDMI, optical link), digital IO ports (RS232, USB, FireWire, Thunderbolt), expansion slots (PCMCIA, ExpressCard, PCI, PCIe), etc.

As shown in FIG. 17, internal architecture 1700 includes one or more processing units, processors, or processing cores, (also referred to herein as CPUs) 1712, which interface with at least one computer bus 1702. Also interfacing with computer bus 1702 are computer-readable medium, or media, 1706, network interface 1714, memory 1704, e.g., random access memory (RAM), run-time transient memory, read only memory (ROM), etc., media disk drive interface 1720 as an interface for a drive that can read and/or write to media including removable media such as floppy, CD-ROM, DVD, etc. media, display interface 1710 as interface for a monitor or other display device, keyboard interface 1716 as interface for a keyboard, pointing device interface 1718 as an interface for a mouse or other pointing device, and miscellaneous other interfaces not shown individually, such as parallel and serial port interfaces, a universal serial bus (USB) interface, and the like.

Memory 1704 interfaces with computer bus 1702 so as to provide information stored in memory 1704 to CPU 1712 during execution of software programs such as an operating system, application programs, device drivers, and software modules that comprise program code, and/or computer-executable process steps, incorporating functionality described herein, e.g., one or more of process flows described herein. CPU 1712 first loads computer-executable process steps from storage, e.g., memory 1704, computer-readable storage medium/media 1706, removable media drive, and/or other storage device. CPU 1712 can then execute the stored process steps in order to execute the loaded computer-executable process steps. Stored data, e.g., data stored by a storage device, can be accessed by CPU 1712 during the execution of computer-executable process steps.

Persistent storage, e.g., medium/media 1706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
   receiving, by an identification computing device of an automated content identification system and from a client computing device, a request for a content identification operation to identify content being received by the client computing device, the request comprising a fingerprint generated from the content to be identified;
   searching, by the identification computing device, a fingerprint database for a reference fingerprint matching the received fingerprint to identify the content being received by the client computing device;
   where a matching reference fingerprint is found, transmitting, by the identification computing device and to the client computing device, a response to the request, the response comprising information identifying a verification computing device of the automated content identification system, the client computing device is assigned to the verification computing device based on at least a portion of the fingerprint received with the request and based on a determination that a number of client computing devices assigned to the identified verification computing device satisfies a given number, the verification computing device is other than the identification computing device and is identified to perform a content verification operation in response to receiving a content verification request from the client computing device to determine whether or not the client computing device continues to receive the content identified by the identification computing device in the content identification operation, the content verification request is to be performed by the verification computing device using a second fingerprint from the client computing device; and
   serving, via the automated content identification system and to a user device, supplementary content for output by the device, the supplementary content related to the identified content being received by the client computing device.

2. The method of claim 1, the user device comprising at least one of the client computing device from which the content identification operation request is received and another computing device providing a second screen experience.

3. The method of claim 1, the method further comprising:
   assigning the client computing device to a new verification device in response to determination that the number of client computing devices assigned to the identified verification computing device is below the given number.

4. The method of claim 3, the assigning is performed by the identification computing device.

5. The method of claim 3, the assigning is performed by the identified verification computing device.

6. The method of claim 1, the method further comprising:
   assigning the client computing device to a new verification device in response to determination that the number of client computing devices assigned to the identified verification computing device exceeds the given number.

7. The method of claim 6, the assigning is performed by the identification computing device.

8. The method of claim 6, the assigning is performed by the identified verification computing device.

9. The method of claim 1, the second fingerprint from the client computing device includes some portion of the fingerprint received, from the client computing device, with the content identification operation request.

10. The method of claim 1, the second fingerprint from the client computing device comprises a fingerprint generated from subsequent content served to the client computing device appended to some portion of the fingerprint received with the content identification operation request.

11. A non-transitory computer-readable storage medium tangibly encoded with computer-executable instructions that when executed by a processor associated with a computing device perform a method comprising:
receiving, from a client computing device, a request for an identification computing device of an automated content identification system to perform a content identification operation to identify content being received by the client computing device, the request comprising a fingerprint generated from the content to be identified;
searching a fingerprint database for a reference fingerprint matching the received fingerprint to identify the content being received by the client computing device;
where a matching reference fingerprint is found, transmitting, to the client computing device, a response to the request, the response comprising information identifying a verification computing device of the automated content identification system, the client computing device is assigned to the verification computing device based on at least a portion of the fingerprint received with the request and based on a determination that a number of client computing devices assigned to the identified verification computing device satisfies a given number, the verification computing device is other than the identification computing device and is identified to perform a content verification operation in response to receiving a content verification request from the client computing device to determine whether or not the client computing device continues to receive the content identified by the identification computing device in the content identification operation, the content verification request is to be performed by the verification computing device using a second fingerprint from the client computing device; and
serving, to a user device, supplementary content for output by the device, the supplementary content related to the identified content being received by the client computing device.

12. The non-transitory computer-readable storage medium of claim 11, the user device comprising at least one of the client computing device from which the content identification operation request is received and another computing device providing a second screen experience.

13. The non-transitory computer-readable storage medium of claim 11, further comprising:
assigning the client computing device to a new verification device in response to determination that the number of client computing devices assigned to the identified verification computing device is below the given number.

14. The non-transitory computer-readable storage medium of claim 13, the assigning is performed by one of the identification computing device and the identified verification computing device.

15. The non-transitory computer-readable storage medium of claim 11, further comprising:
assigning the client computing device to a new verification device in response to determination that the number of client computing devices assigned to the identified verification computing device exceeds the given number.

16. The non-transitory computer-readable storage medium of claim 15, the assigning is performed by one of the identification computing device and the identified verification computing device.

17. The non-transitory computer-readable storage medium of claim 11, the second fingerprint from the client computing device comprises a fingerprint generated from subsequent content served to the client computing device appended to some portion of the fingerprint received with the content identification operation request.

18. A computing device comprising:
a processor;
a non-transitory storage medium for tangibly storing thereon program logic for execution by the processor, the program logic comprising:
receiving logic executed by the processor for receiving, from a client computing device, a request for an identification computing device of an automated content identification system to perform a content identification operation to identify content being received by the client computing device, the request comprising a fingerprint generated from the content to be identified;
searching logic executed by the processor for searching a fingerprint database for a reference fingerprint matching the received fingerprint to identify the content being received by the client computing device;
where a matching reference fingerprint is found, transmitting logic executed by the processor for transmitting, to the client computing device, a response to the request, the response comprising information identifying a verification computing device of the automated content identification system, the client computing device is assigned to the verification computing device based on at least a portion of the fingerprint received with the request and based on a determination that a number of client computing devices assigned to the identified verification computing device satisfies a given number, the verification computing device is other than the identification computing device and is identified to perform a content verification operation in response to receiving a content verification request from the client computing device to determine whether or not the client computing device continues to receive the content identified by the identification computing device in the content identification operation, the content verification request is to be performed by the verification computing device using a second fingerprint from the client computing device; and
serving logic executed by the processor for serving, to a user device, supplementary content for output by the device, the supplementary content related to the identified content being received by the client computing device.

\* \* \* \* \*